(12) United States Patent
Horii

(10) Patent No.: US 8,767,096 B2
(45) Date of Patent: Jul. 1, 2014

(54) IMAGE PROCESSING METHOD AND APPARATUS

(71) Applicant: FUJIFILM Corporation, Tokyo (JP)

(72) Inventor: Hirofumi Horii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/686,158

(22) Filed: Nov. 27, 2012

(65) Prior Publication Data

US 2013/0083221 A1     Apr. 4, 2013

Related U.S. Application Data

(63) Continuation of application No. PCT/JP2011/063673, filed on Jun. 15, 2011.

(30) Foreign Application Priority Data

Jun. 30, 2010   (JP) .................................. 2010-149556

(51) Int. Cl.
   *H04N 5/262*   (2006.01)
   *H04N 5/228*   (2006.01)
   *H04N 5/76*    (2006.01)
   *H04N 5/222*   (2006.01)
   *G06K 9/00*    (2006.01)

(52) U.S. Cl.
   USPC ............... 348/239; 348/208.4; 348/222.1; 348/231.3; 348/333.01; 348/333.02; 382/165

(58) Field of Classification Search
   CPC .................................................. H04N 1/0087
   USPC ........................... 348/208.99–208.16, 222.1, 348/231.99–231.9, 239, 333.01–333.13; 382/103, 165, 209–223
   See application file for complete search history.

(56) References Cited

U.S. PATENT DOCUMENTS

| 6,166,744 A * | 12/2000 | Jaszlics et al. | 345/629 |
| 6,937,255 B2 * | 8/2005 | Fukuda et al. | 345/633 |
| 7,298,384 B2 * | 11/2007 | Anabuki et al. | 345/633 |
| 2002/0059648 A1 * | 5/2002 | Ohba et al. | 725/153 |

(Continued)

FOREIGN PATENT DOCUMENTS

| EP | 2113881 A1 | 11/2009 |
| GB | 2399248 A | 9/2004 |

(Continued)

OTHER PUBLICATIONS

International Preliminary Report on Patentability and Written Opinion, dated Feb. 21, 2013, issued in corresponding International Application No. PCT/JP2011/063673, 5 pages in English.

(Continued)

*Primary Examiner* — Michael Osinski
(74) *Attorney, Agent, or Firm* — Sughrue Mion, PLLC

(57) ABSTRACT

An AR taking image producer produces an AR taking image of a current frame. A displaying image producer produces a displaying image of the current frame and first to fourth interpolative displaying images. An image pattern reader reads a marker on the AR taking image. CPU retrieves AR moving image that is associated with the marker from an AR image memory. An AR image overlying section produces first to fourth interpolative AR images, and overlies the images on the areas of the marker.

16 Claims, 21 Drawing Sheets

(56) References Cited

U.S. PATENT DOCUMENTS

| | | | |
|---|---|---|---|
| 2002/0075286 A1* | 6/2002 | Yonezawa et al. | 345/679 |
| 2003/0011683 A1* | 1/2003 | Yamasaki et al. | 348/207.1 |
| 2004/0117729 A1* | 6/2004 | Ariga | 715/500.1 |
| 2004/0189823 A1* | 9/2004 | Shibutani | 348/231.1 |
| 2005/0068314 A1* | 3/2005 | Aso et al. | 345/419 |
| 2005/0152002 A1* | 7/2005 | Shirakawa et al. | 358/1.18 |
| 2006/0073892 A1 | 4/2006 | Watanabe et al. | |
| 2006/0079324 A1* | 4/2006 | Watanabe et al. | 463/30 |
| 2007/0248283 A1 | 10/2007 | Mack et al. | |
| 2007/0260985 A1* | 11/2007 | Utagawa et al. | 715/721 |
| 2009/0195538 A1 | 8/2009 | Ryu et al. | |
| 2009/0268076 A1* | 10/2009 | Kawamura et al. | 348/333.12 |
| 2010/0026714 A1 | 2/2010 | Utagawa | |
| 2010/0157096 A1* | 6/2010 | Park et al. | 348/231.3 |
| 2010/0328319 A1* | 12/2010 | Ikenoue | 345/474 |
| 2011/0025885 A1* | 2/2011 | Minami | 348/231.3 |
| 2011/0058087 A1* | 3/2011 | Ito et al. | 348/333.12 |
| 2011/0122291 A1* | 5/2011 | Nakamura et al. | 348/231.2 |
| 2011/0149117 A1* | 6/2011 | Vendrig | 348/239 |
| 2011/0176010 A1* | 7/2011 | Houjou et al. | 348/207.1 |
| 2011/0194010 A1* | 8/2011 | Nakase et al. | 348/333.11 |
| 2012/0045093 A1* | 2/2012 | Salminen et al. | 382/103 |
| 2012/0057051 A1* | 3/2012 | Ito et al. | 348/239 |
| 2012/0105676 A1* | 5/2012 | Park | 348/231.3 |
| 2012/0120312 A1* | 5/2012 | Yamasaki et al. | 348/461 |

FOREIGN PATENT DOCUMENTS

| | | |
|---|---|---|
| JP | 2000-322602 A | 11/2000 |
| JP | 2005-136639 A | 5/2005 |
| JP | 2005-230139 A | 9/2005 |
| JP | 2005-250950 A | 9/2005 |
| JP | 2008-193640 A | 8/2008 |
| JP | 2010-039556 A | 2/2010 |

OTHER PUBLICATIONS

Communication, dated Jan. 20, 2014, issued in corresponding EP Application No. 11800616.2, 7 pages in English.

* cited by examiner

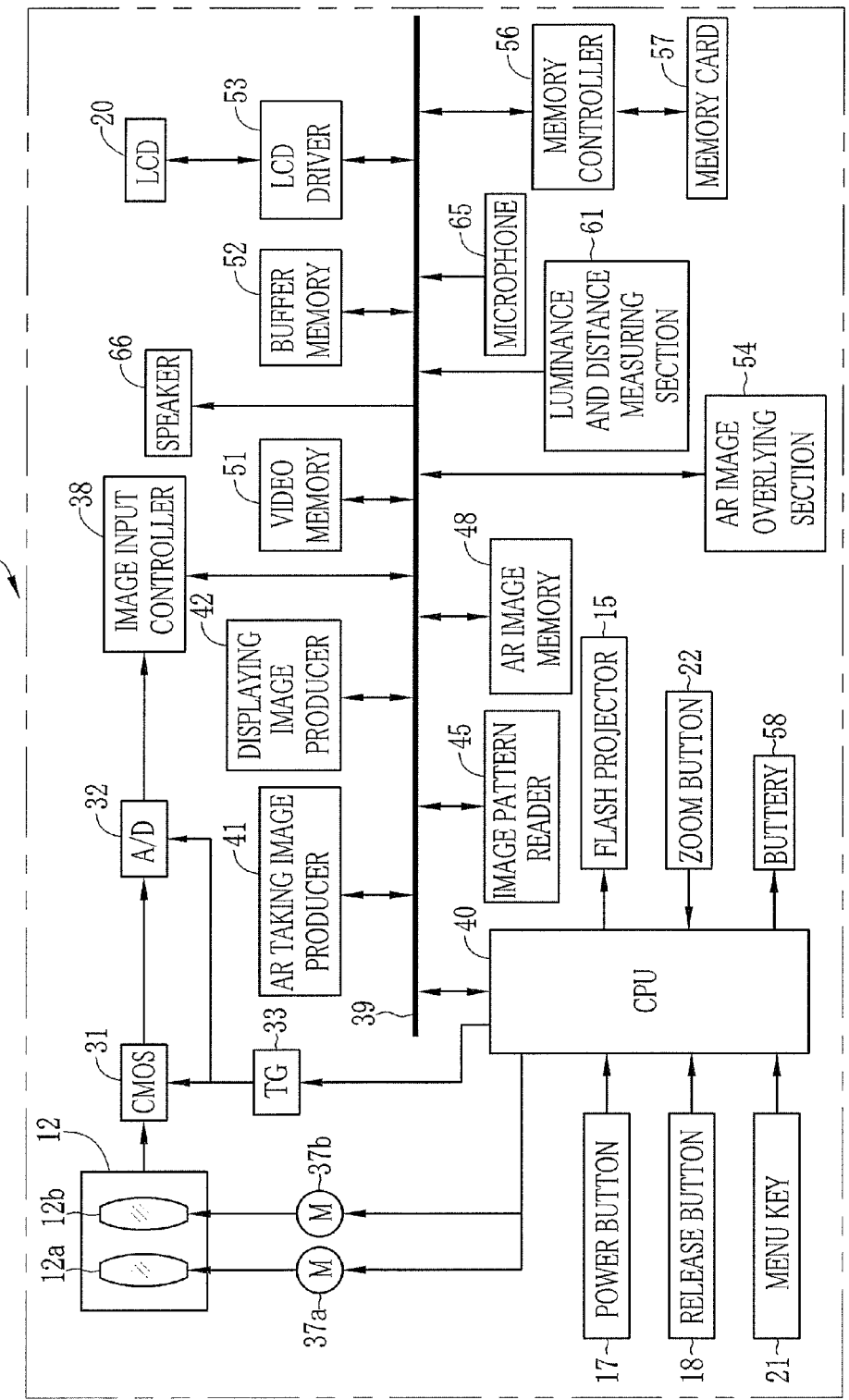

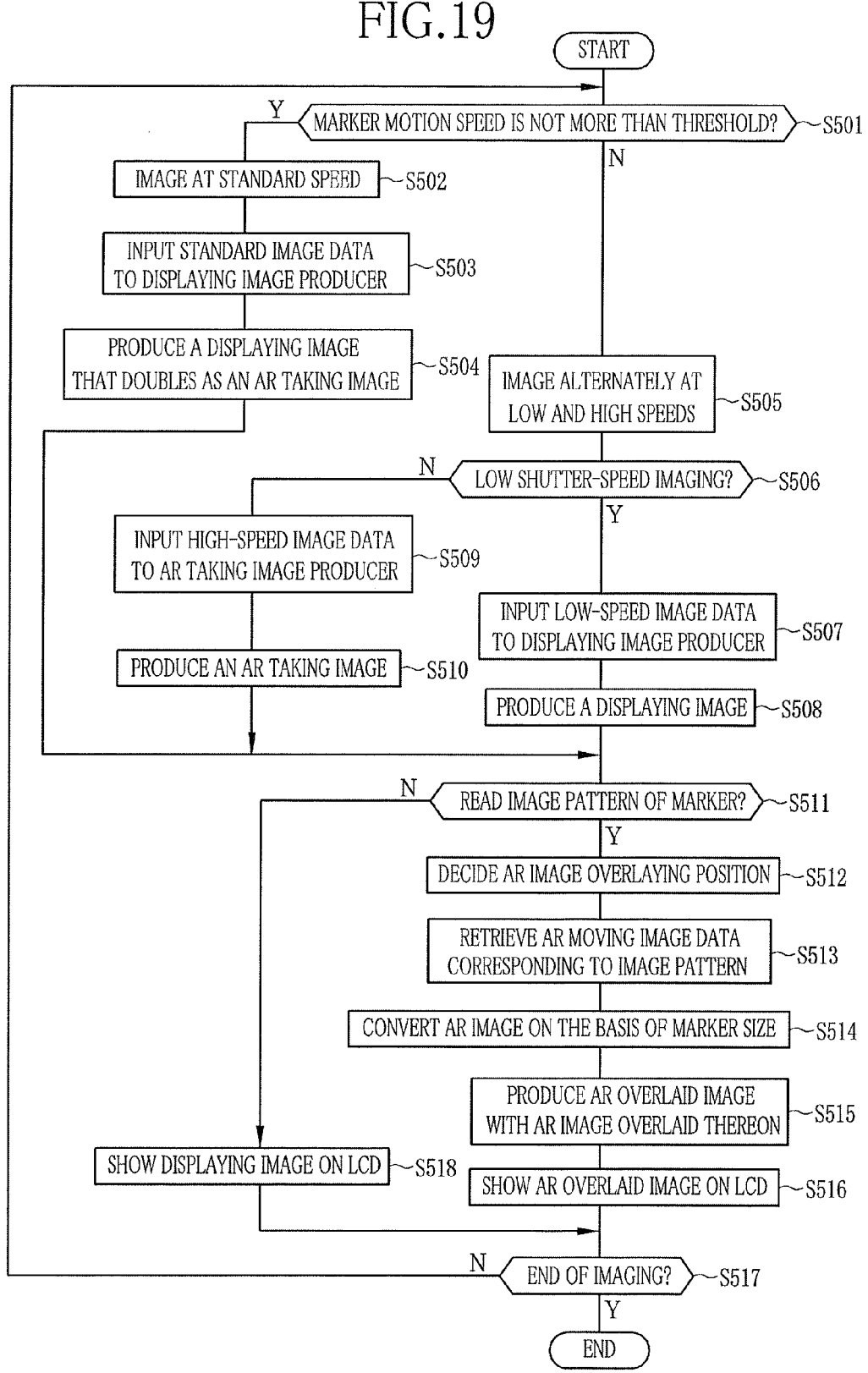

IMAGE PROCESSING METHOD AND APPARATUS

BACKGROUND OF THE INVENTION

1. Field of the Invention

The present invention relates to an image processing method and an apparatus therefor, whereby additional information is superimposed on a captured image.

2. Description of the Related Art

Video cameras and digital cameras for use in capturing moving images have been widely spread and used for example for photographing children in an amusement park or the like. These video cameras and digital cameras are provided with an imaging section, a recording section for recording acquired image data, and a display device, such as an LCD, for displaying images which are being currently captured or images which have been recorded therein. The video cameras and digital cameras are mostly equipped with function of taking still images as well as moving images.

Recently, such a video camera or digital camera has been known that is equipped with an augmented reality representing function, whereby a variety of additional information or augmented reality (AR) information may be superimposed on an image of a physical space, e.g. an image of a landscape, which is captured and displayed by the camera. A system described in Japanese Patent Laid-open Application Publication No. 2010-039556 predicts the time of completion at which a CG generating section completes generating a virtual space image to be superimposed on the physical space image, and then predicts the position and orientation of a viewpoint at the predicted generation complete time. The CG generating section generates the virtual space image in a condition as visible from the predicted position and orientation of the viewpoint, and superimposes the same on the physical space image. Thus, the virtual space image may be composited on the physical space image without any unnatural impression, even while it takes time to generate the virtual space image.

In the system described in Japanese Patent Laid-open Application Publication No. 2010-039556, a virtual object is retrieved from a database on the basis of information on the detected position and orientation. If the accuracy of the information on the detected position and orientation is low or the detected position and orientation deviate from correct ones, the virtual object will be retrieved on the basis of the incorrect position and orientation instead of the correct ones. As a result, it sometimes happens that the superimposed virtual space image does not match the physical space image.

A terminal device described in Japanese Patent Laid-open Application Publication No. 2008-193640 reads a digital code, such as QR code (a trademark), as the code being represented on a captured image, and acquires additional information on the basis of the read digital code. Then, the acquired additional information is overlaid on the captured image as displayed on a display means. Thus, only such additional information that corresponds to the digital code represented on the captured image is overlaid on the captured image, but such additional information that is unsuitable for the captured image will not be overlaid thereon.

In order to make sure to acquire additional information from a captured image, the captured image is required to represent the digital code with little blur. In contrast, for the sake of fluent or fluid representation of successive moving images, the subjects other than the digital code should be moderately blurred in the captured images. That is, images suitable for reliable acquisition of additional information discord with images suitable for fluent representation of moving images. Therefore, in the device in which additional information is acquired from those images which are captured to be displayed on the display means, as described in Japanese Patent Laid-open Application Publication No. 2008-193640, it is hard to achieve reliable acquisition of additional information and fluid representation of moving images at the same time.

SUMMARY OF THE INVENTION

An object of the present invention is to provide an image processing method and an apparatus therefor, whereby additional information can be acquired without fail and, at the same time, moving images can be displayed fluidly in continuous succession.

To achieve the above object, an image processing apparatus of the present invention includes an imaging section, a displaying image producing section, an additional information reference image producing section, a reading section, an additional information recording section, an additional information acquiring section, an additional information overlaid image producing section, and a displaying device. The imaging section captures images in continuous succession by imaging a subject together with a marker, the captured images constituting moving images. The displaying image producing section produces a displaying image on the basis of the captured image each time the image is captured, the displaying image being for making the motion of the subject continuous in displaying the moving images. The additional information reference image producing section produces an additional information reference image on the basis of the captured image each time the image is captured, the additional information reference image representing the subject with less blurs and being used to acquire additional information that is to be overlaid on the displaying image. The reading section reads the marker on the additional information reference image. In the additional information recording section, additional information is recorded in association with individual markers. The additional information acquiring section retrieves and acquires additional information that is associated with the marker read by the reading section from among a plurality of additional information recorded in the additional information recording section. The additional information overlaid image producing section produces an additional information overlaid image in which the additional information acquired by the additional information acquiring section is overlaid on the displaying image in the area of the marker. The displaying device displays the additional information overlaid image. Note that the marker may have a bar code, a QR code (a trade mark) and the like.

The imaging section preferably captures images at a shutter speed suitable for producing the additional information reference image, and the displaying image producing section also produces a plurality of interpolative displaying images which are to be displayed in between successive ones of the displaying images. The additional information overlaid image producing section overlies additional information, which has been acquired by the additional information acquiring section, on the interpolative displaying images in the areas of the marker, to produce the additional information overlaid images.

The imaging section may preferably make imaging alternately at a first shutter speed that is suitable for producing the displaying image and a second shutter speed that is higher than the first shutter speed and suitable for producing the additional information reference image. The displaying image producing section produces the displaying image on the basis of an image taken through the first shutter speed imaging. The additional information reference image producing section produces the additional information reference image on the basis of an image taken through the second shutter speed imaging.

The imaging section may preferably make imaging concurrently at a first shutter speed that is suitable for producing the displaying image and a second shutter speed that is higher than the first shutter speed and suitable for producing the additional information reference image. The displaying image producing section produces the displaying image on the basis of an image taken through the first shutter speed imaging. The additional information reference image producing section produces the additional information reference image on the basis of an image taken through the second shutter speed imaging.

It is preferable to include a position correcting section. The position correcting section corrects the position of overlying the additional information on the displaying image on the basis of a difference in time of production between the displaying image and the additional information reference image.

The displaying image producing section preferably produces the displaying image to have a high resolution and such color reproduction that is suitable for displaying moving images. The additional information reference image producing section produces the additional information reference image to have a higher SN ratio and a wider dynamic range than the displaying image.

It is preferable to include further a detecting section and a determining section. The detecting section detects the speed of movement of the imaging section. The determining section determines whether the speed of movement detected by the detecting section is more than a predetermined threshold level or not. When the determining section determines that the speed of movement is not more than the threshold level, the additional information reference image producing section does not produce the additional information reference image and the reading section reads the marker in the displaying image.

It is also preferable to include a marker motion speed detecting section and a marker motion speed determining section. The marker motion speed detecting section detects the motion speed of the marker. The marker motion speed determining section determines whether the motion speed detected by the marker motion speed detecting section is more than a predetermined threshold level or not. When the marker motion speed determining section determines that the motion speed is not more than the threshold level, the additional information reference image producing section does not produce the additional information reference image and the reading section reads the marker in the displaying image.

Moreover, it is preferable to include an additional information overlaid image recording section for recording the additional information overlaid image.

An image processing method of the present invention includes an imaging step, a displaying image producing step, an additional information reference image producing step, a reading step, an additional information acquiring step, an additional information overlaid image producing step, and a displaying step. The imaging step is capturing images in continuous succession by imaging a subject together with a marker, the captured images constituting moving images. The displaying image producing step is producing a displaying image on the basis of the captured image each time the image is captured, the displaying image being for making the motion of the subject continuous in displaying the moving images. The additional information reference image producing step is producing an additional information reference image on the basis of the captured image each time the image is captured, the additional information reference image representing the subject with less blurs and being used to acquire additional information that is to be overlaid on the displaying image. The reading step is reading the marker on the additional information reference image. The additional information acquiring step is retrieving and acquiring additional information that is associated with the marker read by the reading step from an additional information recording section in which additional information is recorded in association with individual markers. The additional information overlaid image producing step is producing an additional information overlaid image in which the additional information acquired by the additional information acquiring step is overlaid on the displaying image in the area of the marker. The displaying step is displaying the additional information overlaid image.

According to the present invention, additional information reference images suitable for acquiring additional information and displaying images suitable for displaying moving images are produced on the basis of captured images, making sure to acquire additional information and achieving continuous and fluid display of moving images.

Since the additional information reference images and the displaying images are produced on the basis of images captured by a single imaging section, it is possible to prevent an increase in the number of parts in comparison with those where two imaging sections are provided for obtaining the additional information reference image and the displaying image separately from each other.

BRIEF DESCRIPTION OF DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 3 is a block diagram illustrating an electric structure of the digital camera.

FIG. 19 is an explanatory diagram illustrating procedures for displaying AR overlaid images in the sixth embodiment.

DESCRIPTION OF THE PREFERRED EMBODIMENTS

First Embodiment

Figure 1:
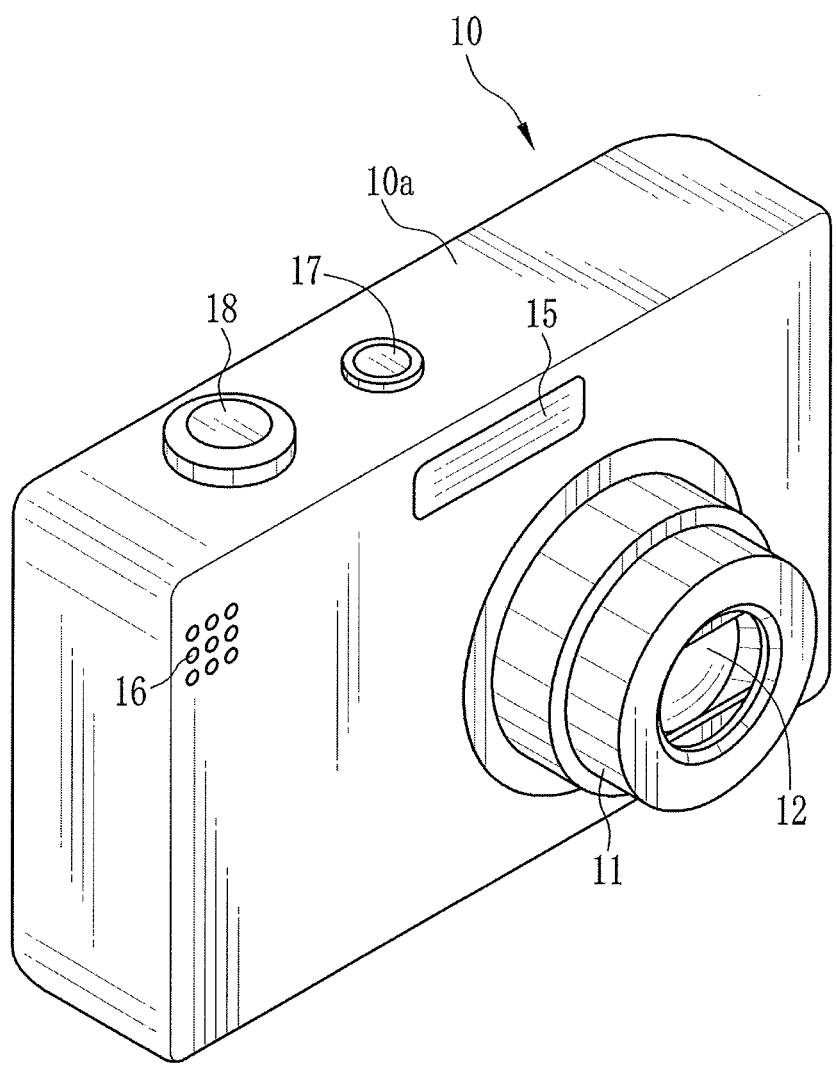
FIG. 1 is a front perspective view of a digital camera embodying the present invention.

As shown in FIG. 1, a digital camera 10 is provided with a lens barrel 11 on the front of a camera body 10a. The lens barrel 11 has an imaging lens 12 mounted therein. The lens barrel 11 is located in the camera body 10a while the digital camera 10 is off-power. When the power is on, the lens barrel 11 protrudes from the front of the camera body 10a, to be set in a wide position. A zoom lens, which has a varifocal lens 12a and a focusing lens 12b (see FIG. 3), serves as the imaging lens 12.

A flash projector 15 and sound collecting holes 16 for letting external sounds enter a microphone 65 (see FIG. 3) are provided on the front of the camera body 10a. The flash projector 15 is actuated by a CPU 40 (see FIG. 3), to project a flashlight toward a subject. On the top of the camera body 10a are provided a power button 17, a release button 18, etc.

The digital camera 10 is provided with a still image capturing mode for capturing still images, a movie capturing mode for capturing moving images for example at a rate of 30 frames per second, and a reproduction mode for reproducing and displaying captured images. In the movie capturing mode, a movie capturing session starts upon the release button 18 being pressed down to the full, and ends with a release from the full-pressing.

Figure 2:
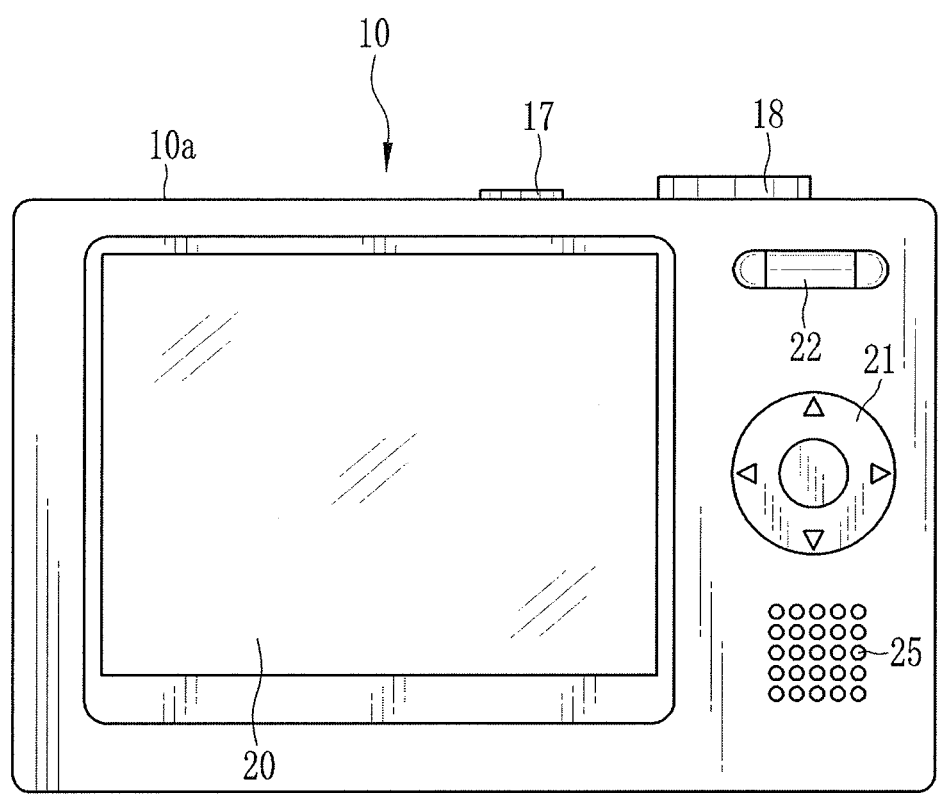
FIG. 2 is a rear view of the digital camera.

As shown in FIG. 2, on the rear side of the camera body 10a, there are provided an LCD 20 for displaying images or various setup conditions, a menu key 21 for setting conditions of imaging and selecting the modes, and a zoom button 22 for changing magnification of the imaging lens 12. An operation on the zoom button 22 causes the varifocal lens 12a to move in between a wide-angle position and a telephoto position, enlarging or reducing the image size. Speaker holes for letting sounds output from a speaker 66 (see FIG. 3) outward are provided on the rear side of the camera body 10a.

As shown in FIG. 3, a color image sensor, for example, a CMOS sensor 31 is disposed behind the imaging lens 12 such that light from the subject will be incident on the sensor through the imaging lens 12. The CMOS 31 photoelectrically converts the light from the subject to generate time-sequential three-color signals, as well-known in the art. A timing generator (TG) 33 is controlled by the CPU 40, to generate drive timing signals for driving the CMOS 31. The three-color signals generated from the CMOS 31 are processed in an analog processing circuit (not shown) for reduction of noise components from the three-color signals and amplification thereof, and thereafter sent to an A/D converter 32.

The A/D converter 32 converts the three-color signals to digital three-color image data (hereinafter called simply the image data). A zooming mode 37a and a focusing mode 37a are driven by the CPU 40 via a motor driver (not shown), to move the varifocal lens 12a and the focusing lens 12b for zooming and focusing, respectively.

As well-known in the art, the CPU 40 is connected to an EEPROM (not shown), in which various control programs, setup information and the like are recorded. The CPU 40 controls respective components according to the programs read from the EEPROM. In the present embodiment, the CPU 40 controls execution of high shutter-speed imaging (e.g. with an exposure time of $1/2000$ sec.).

The image input controller 38 transfers the image data from the A/D converter 32 to a video memory 51 for displaying through-images or to a buffer memory 52 during the imaging.

Figure 4A:
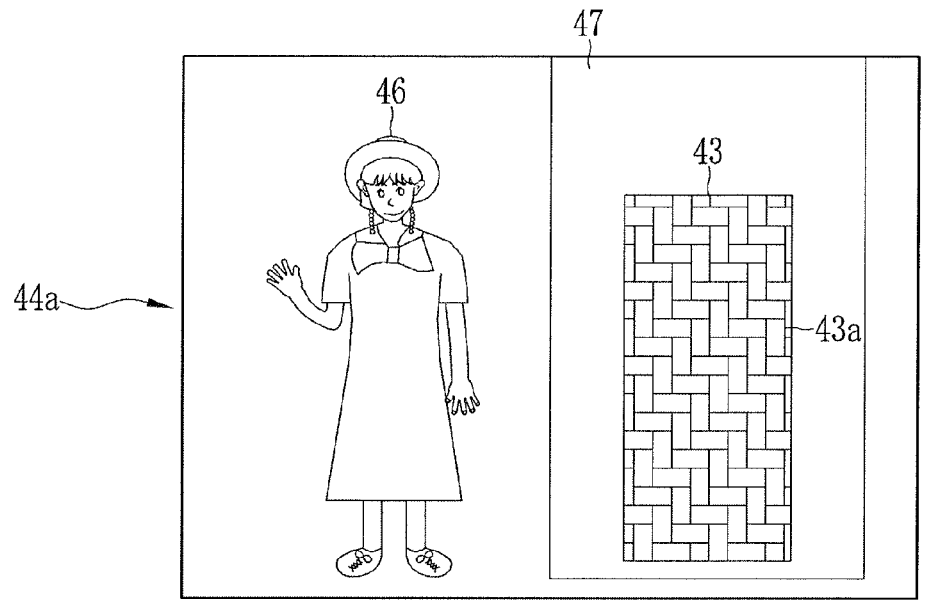
FIG. 4A is an explanatory diagram illustrating an AR taking image or a displaying image of a current frame.
Figure 4B:
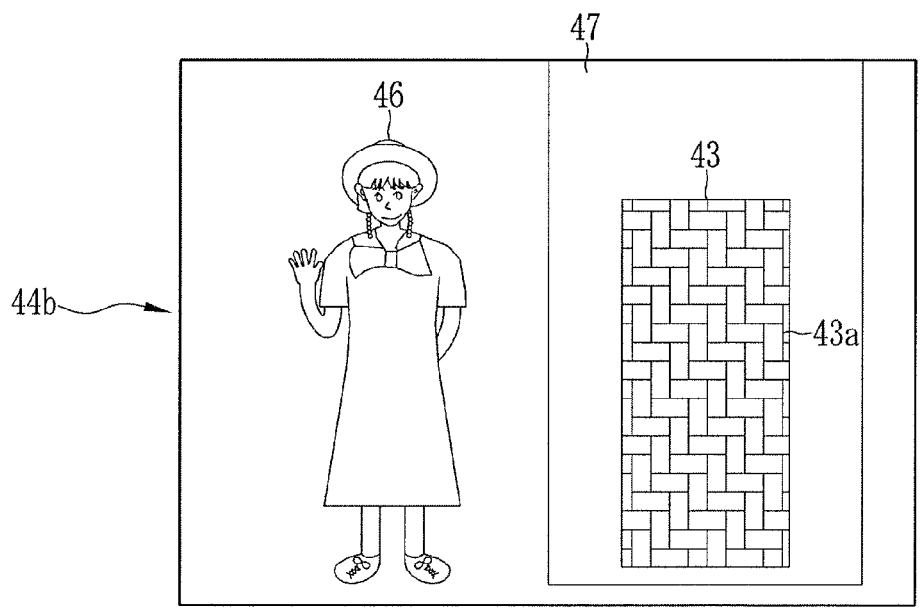
FIG. 4B is an explanatory diagram illustrating an AR taking image or a displaying image of a preceding frame.

The AR taking image producer 41 takes the image data of the captured images from the buffer memory 52, to produce an AR taking image 44a of a current frame (see FIG. 4A), which is used for taking an AR image (additional information). When producing the AR taking image 44a of the current frame, the AR taking image producer 41 executes an SN ratio boosting process by pixel mixing, and also executes a dynamic range widening process by gamma optimization. As a result, the AR taking image 44a of the current frame has a higher SN ratio and a wider dynamic range in comparison with those images which are not rendered with these processes. In the present embodiment, the AR taking image 44a of the current frame consists of a main subject image 46 and a column image 47 with a marker 43.

The AR taking image 44a of the current frame is fed from the AR taking image producer 41 to an image pattern reader 45 for reading a particular image pattern 43a of the marker 43. In the present embodiment, the particular image pattern 43a is constituted of two-dimensional digital codes.

The image pattern reader 45 reads the particular image pattern 43a and detects the position and size of the marker 43 in the AR taking image 44a of the current frame. An AR image memory 48 records data of multiple AR moving images, which are each associated with a particular one of multiple kinds of image patterns 43a. The CPU 40 searches the AR image memory 48 for one AR moving image that is associated with the read particular image pattern 43a.

During capturing through-images, low-resolution image data of each through-image is temporarily stored in the video memory 51. The image data of the through-image is sent to an LCD driver via a data bus 39, so that the through-images are displayed on the LCD 20. For imaging, high-resolution image data is temporarily stored in the buffer memory 52. On the basis of the high-resolution image data read out from the buffer memory 52, the displaying image producer 42 produces a displaying image 50a for displaying a moving image of the current frame (hereinafter referred to as the displaying image 50a), which provides a high resolution and such color reproduction that is suitable for displaying moving images (see FIG. 5A). The displaying image 50a of the current frame, which consists of a main subject image 46 and a column image 47 accompanied with a marker 43, is temporarily stored in the buffer memory 52.

The displaying image producer 42 further produces a plurality of, for example, four (first to fourth) interpolative displaying images 50c to 50f (see FIGS. 5B to 5E) by means of frame-interpolation using the displaying image 50a (see FIG. 5A) of the current frame and a displaying image 50b (see FIG. 5F) of a frame immediately before the current frame (i.e., the preceding frame), which is written in the buffer memory 52.

The displaying image producer 42 carries out motion-prediction and motion-makeup in order to achieve frame interpolation. First, in order to make the motion prediction, the displaying image 50b of the preceding frame is divided into small blocks (e.g. 20 blocks), and the location of each of these blocks is searched for in the displaying image 50a of the current frame (block matching). On the basis of this search result, in what direction and by what amount each block has moved is detected to calculate a motion vector of each block.

Figure 5A:
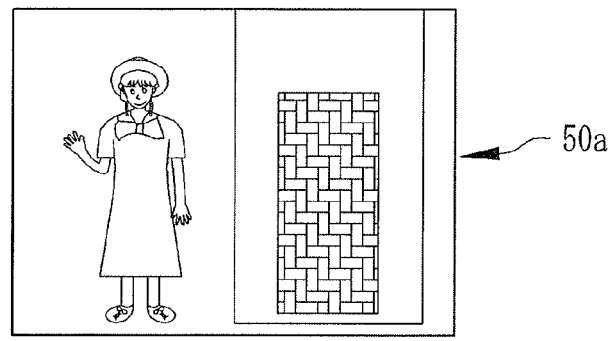
FIG. 5A is an explanatory diagram illustrating the displaying image of the current frame.
Figure 5B:
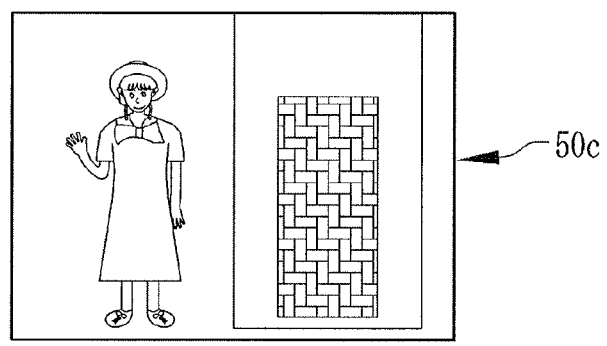
FIG. 5B is an explanatory diagram illustrating a first interpolative displaying image.
Figure 5C:
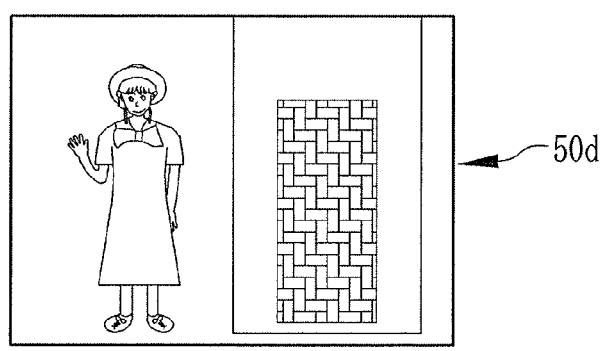
FIG. 5C is an explanatory diagram illustrating a second interpolative displaying image.
Figure 5D:
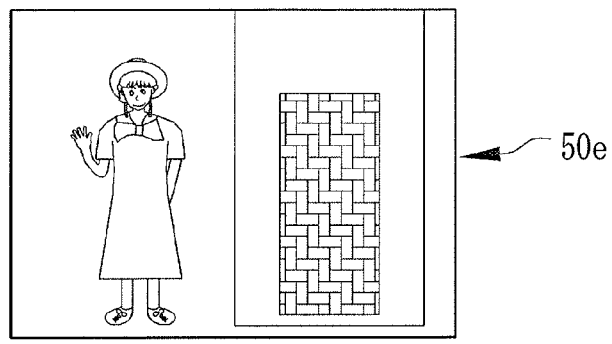
FIG. 5D is an explanatory diagram illustrating a third interpolative displaying image.
Figure 5E:
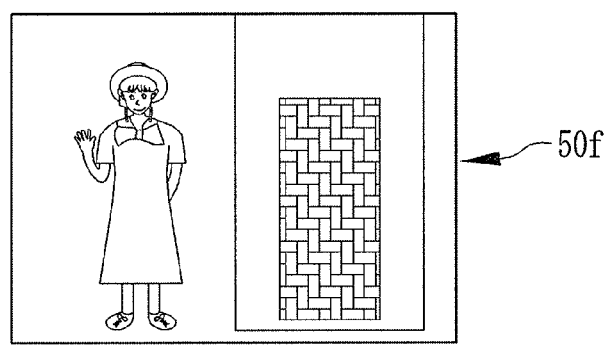
FIG. 5E is an explanatory diagram illustrating a fourth interpolative displaying image.
Figure 5F:
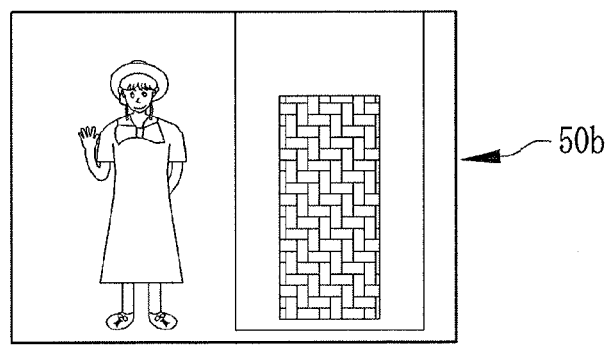
FIG. 5F is an explanatory diagram illustrating the displaying image of the preceding frame.

Next, the displaying image producer 42 decides on the number (or the interpolation interval) of those frame interpolative images which should be displayed in between the displaying image 50a of the current frame, as shown in FIG. 5A, and the displaying image 50b of the preceding frame, as shown in FIG. 5F, for the sake of motion makeup. Then, the amount of the motion vector is equally divided according to the interpolation interval (e.g., four), to calculate a makeup amount for each frame. This process is carried out on each block, to produce the first to fourth interpolative displaying images 50c to 50f, in which the respective blocks are moved by the calculated makeup amounts. Since the first to fourth interpolative displaying images 50c to 50f are produced and displayed in between the displaying image 50a of the current frame and the displaying image 50b of the preceding frame in the present embodiment, one-fifth of the amount of the motion vector between the preceding frame and the current frame comes to the makeup amount for each frame.

Figure 6A:
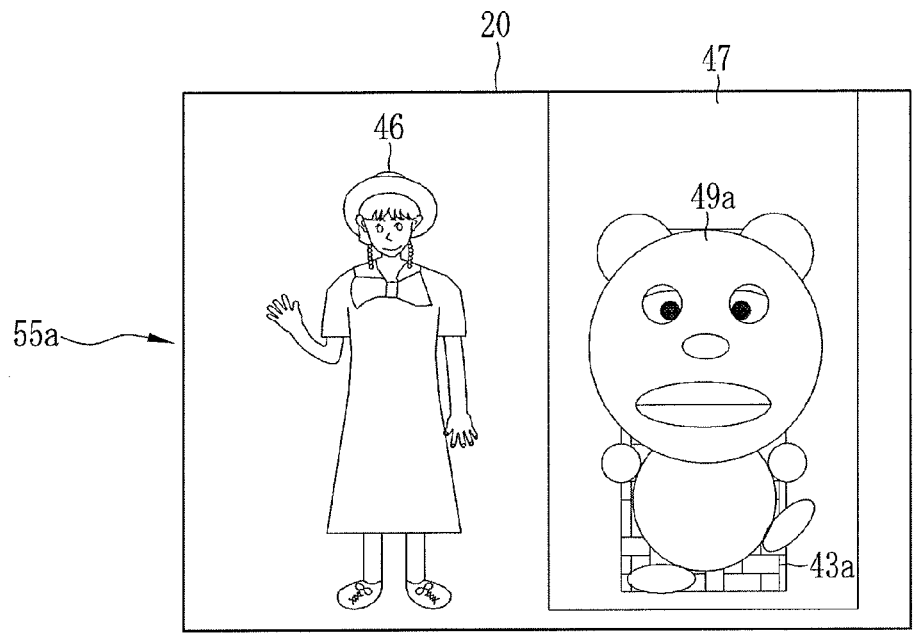
FIG. 6A is an explanatory diagram illustrating an AR overlaid image of the current frame.

As shown in FIG. 6A, the CPU 40 converts data of an AR moving image, as retrieved according to the read particular image pattern 43a, to an AR image 49a of the current frame. The CPU 40 changes the size of the AR image 49a of the current frame on the basis of the size of the marker 43 that is detected by the image pattern reader 45. In the present embodiment, the size of the AR image 49a of the current frame is set approximately equal to that of the marker 43. After this change, the size of the AR image 49a of the current frame may further be changed appropriately, for example, according to the height of the LCD 20.

Figure 6B:
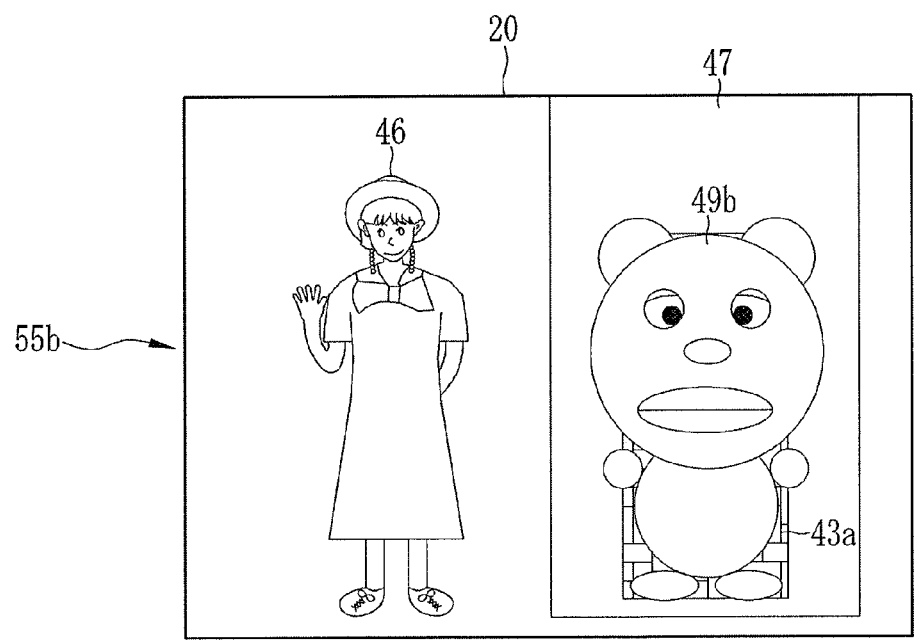
FIG. 6B is an explanatory diagram illustrating an AR overlaid image of the preceding frame.

An AR image overlying section 54 produces an AR overlaid image 55a of the current frame by overlying the AR image 49a of the current frame on an area of the displaying image 50a of the current frame, which is indicated by the marker 43. This AR overlaid image 55a of the current frame is displayed on the LCD 20 and, at the same time, recorded on a memory card 57 by a data reader that is under the control of a memory controller. As shown in FIG. 6B, an AR overlaid image 55b of the preceding frame, wherein an AR image 49b of the preceding frame is overlaid on the displaying image 50b of the preceding frame, has been recorded on the memory card 57.

Figure 7A:
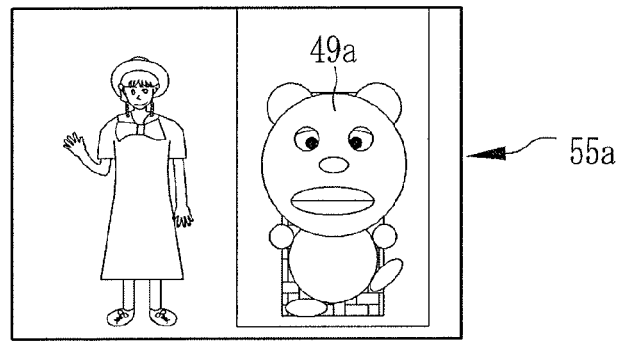
FIG. 7A is an explanatory diagram illustrating the AR overlaid image of the current frame.
Figure 7B:
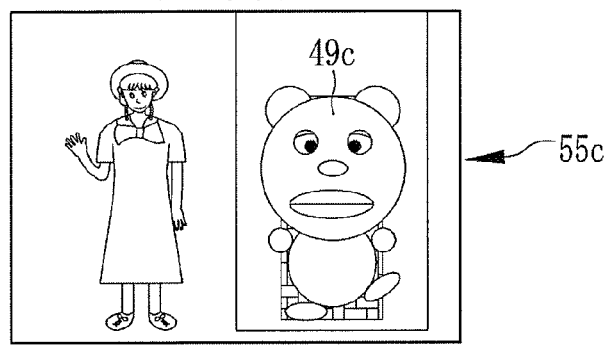
FIG. 7B is an explanatory diagram illustrating a first interpolative AR overlaid image.
Figure 7C:
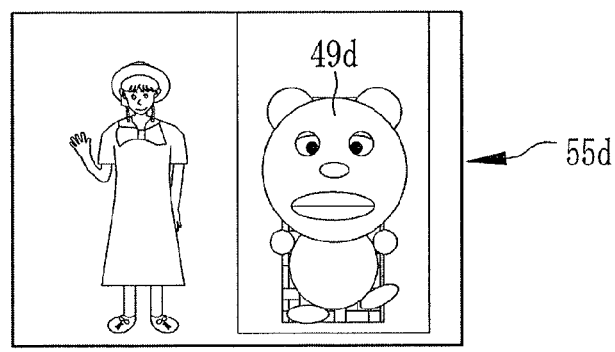
FIG. 7C is an explanatory diagram illustrating a second interpolative AR overlaid image.
Figure 7D:
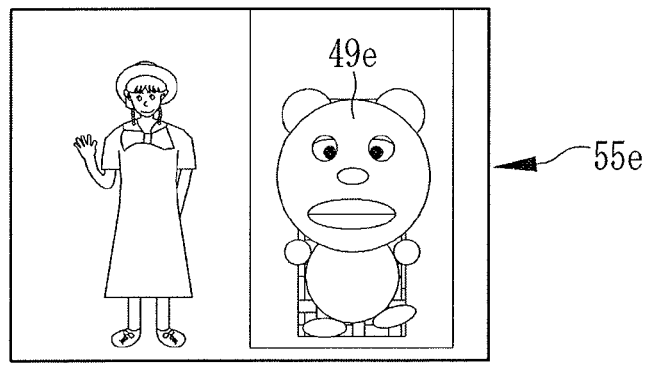
FIG. 7D is an explanatory diagram illustrating a third interpolative AR overlaid image.
Figure 7E:
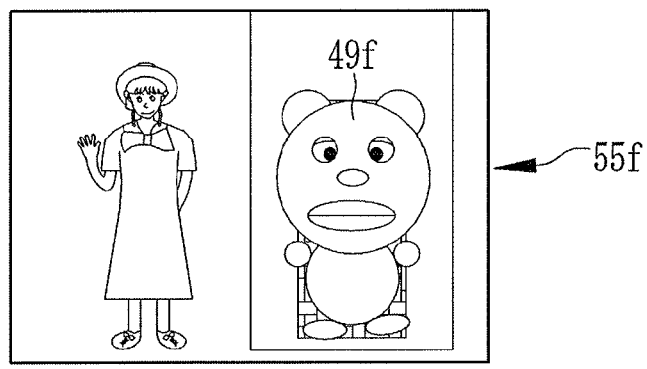
FIG. 7E is an explanatory diagram illustrating a fourth interpolative AR overlaid image.
Figure 7F:
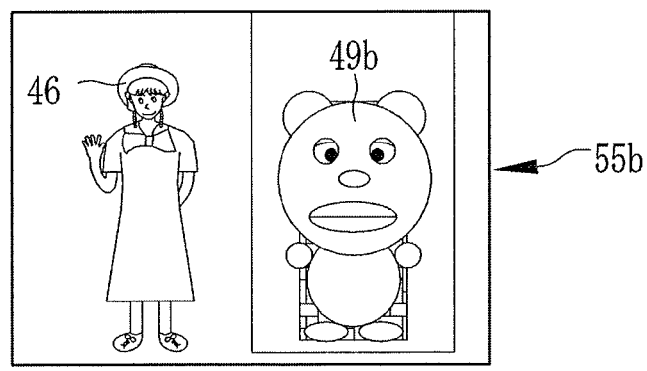
FIG. 7F is an explanatory diagram illustrating the AR overlaid image of the preceding frame.

As image data of a new frame (the current frame) is fed from the image input controller 38 to the buffer memory 52, the AR image overlying section 54 produces four, i.e., first to fourth interpolative AR images 49c to 49f, which are located in between the AR overlaid image 55a (see FIG. 7A) of this current frame and the AR overlaid image 55b (see FIG. 7F) of the preceding frame that has been recorded on the memory card 57, in the same way as the displaying image producer 42 produces the respective interpolative displaying images 50c to 50f. Then, these first to fourth interpolative AR images 49c to 49f are overlaid on the first to fourth interpolative displaying images 50c to 50f to produce first to fourth interpolative AR overlaid images 55c to 55f. These image rendering processes are carried out successively to produce AR added moving images of 150 frames per second. The AR added moving images achieve displaying the subject in fluid succession during the movie display, like as moving images of 30 frames per second, which are captured at a low shutter speed (e.g., with an exposure time of 1/60 sec.), while the imaging is done at a high shutter speed (with an exposure time of 1/2000 sec.) The first to fourth interpolative AR overlaid images 55c to 55f are recorded on the memory card 57 through the memory controller 56. Note that a detachably attachable external recording medium, such as a memory stick, may be used instead of the memory card 57.

Referring back to FIG. 3, a luminance and distance measuring section 61 detects luminance of a subject being captured and distance to the subject on the basis of image data of through-images, and decides by the detected result a white balance correction amount and a lens in-focus distance. The luminance and distance measuring section 61 operates at predetermined cycles while the through-images are being displayed. The subject distance may be measured by means of a well-known phase difference detection method.

The luminance and distance measuring section 61 sequentially transmits the result of detected luminance and subject distance to the CPU 40. The CPU 40 drives the focusing lens 12b to move according to the lens in-focus distance provided from the luminance and distance measuring section 61. The CPU 40 also controls the shutter speed (charge accumulation time) of the CMOS 31 and the operation of the flash projector 15 on the basis of the luminance detected by the luminance and distance measuring section 61.

A battery 58 is contained in the digital camera 10, to supply power to the components including the LCD 20 and the CPU 40. The power supply to the components is controlled by a control circuit (not shown) for the battery 58.

A microphone 65 is provided with a transducer (not shown) for converting sounds to audio data (electric signals), so as to collect sounds from the scenes during the movie capturing and convert the collected sounds to audio data. The audio data is recorded on the memory card 57 along with the respective images 55a to 55f. A speaker 66 outputs the recorded audio data during the movie reproduction.

Figure 8:
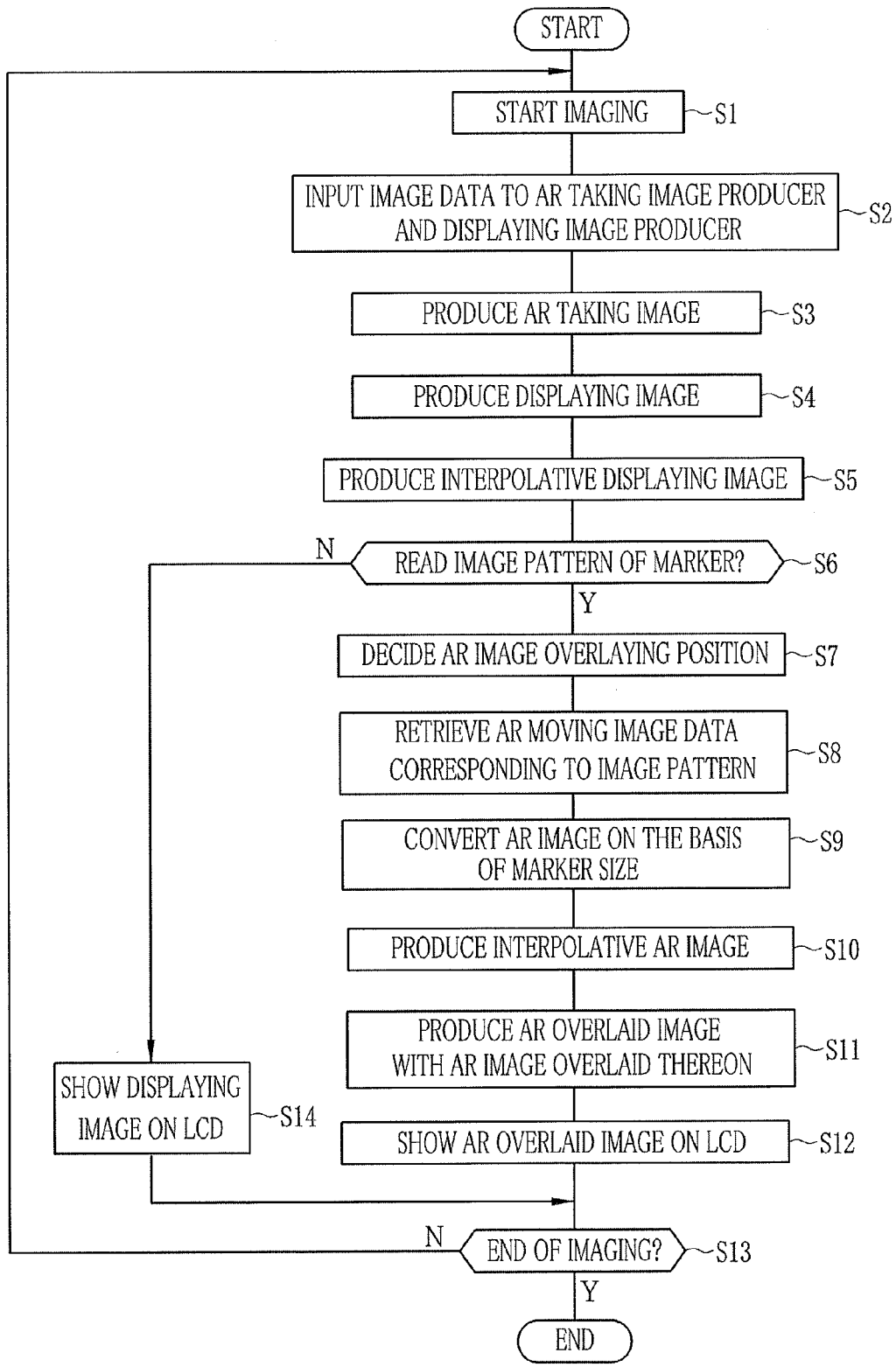
FIG. 8 is a flowchart illustrating procedures for displaying AR overlaid images.

Next, the operation of the above first embodiment will be described with reference to the flowchart of FIG. 8. After setting to the movie capturing mode, the release button 18 is pushed down to the full, making the movie capturing at the high shutter speed (with the exposure time of 1/2000 sec.) (step 1: S1). The obtained image data is fed through the buffer memory 52 to the AR taking image producer 41 and the displaying image producer 42 (S2). The AR taking image producer 41 renders the image data with the SN ratio boosting process and the dynamic range widening process, to produce an AR taking image 44a of the current frame (S3). This AR taking image 44a of the current frame is fed to the image pattern reader 45. Hereinafter, the image processing of the second and following frames will be explained on the assumption that image data of the first frame that has been captured immediately after the start of imaging (that is, an AR overlaid image 55b of the preceding frame) exists.

Simultaneously with the above operation, the displaying image producer 42 produces a displaying image 50a of the current frame as shown in FIG. 5A on the basis of newly-input high-resolution image data of the current frame (S4). Then the displaying image producer 42 makes the frame interpolating process using the displaying image 50a of the current frame and a displaying image 50b of the preceding frame, as shown in FIG. 5F, which is recorded in the buffer memory 52, thereby producing four or first to fourth interpolative displaying images 50c to 50f, which serve to display the subject in fluid succession during the movie display (S5). After these are produced, the displaying image 50a of the current frame is recorded as the displaying image 50b of the preceding frame in the buffer memory 52.

As the image pattern reader 45 reads the particular image pattern 43a on the AR taking image 44a of the current frame (Y in S6), the position and size of the marker 43 in the AR taking image 44a of the current frame are detected, and the overlying position of the AR image 49a of the current frame is determined (S7). In the present embodiment, the overlying position of the AR image 49a of the current frame corresponds to the display position of the marker 43. The AR taking image 44a of the current frame is produced from image data acquired through the high shutter speed imaging and is further rendered with the SN ratio boosting process and the dynamic range widening process. This contributes to improving accuracy of reading of the particular image pattern 43a in comparison with an image without being rendered with the above respective processes or an image produced from such image data that are acquired through the low shutter-speed imaging.

The CPU 40 searches the AR image memory 48 for such AR moving image data that is allocated to the particular image pattern 43a read by the image pattern reader 45 (S8). The CPU 40 reads out the hit AR moving image data of one frame from the AR image memory 48, and converts this data to an AR image 49a of the current frame in the size approximately equal to the marker 43 (S9).

The AR image overlying section 54 produces the four, i.e., first to fourth interpolative AR images 49c to 49f, which are to be displayed in between the AR image 49a of the current frame and the AR image 49b of the preceding frame (S10). The AR image overlying section 54 overlies the AR image 49a of the current frame and the first to fourth interpolative AR images 49c to 49f on the displaying image 50a of the current frame and the first to fourth interpolative displaying images 50c to 50f, respectively, in the areas corresponding to the markers 43 thereof. As a result of this overlying process, an AR overlaid image 55a of the current frame and first to fourth interpolative AR overlaid images 55c to 55f are produced, as shown in FIGS. 7A to 7E (S11). Then, the AR overlaid image 55b of the preceding frame, the fourth interpolative AR overlaid image 55f, the third interpolative AR overlaid image 55e, the second interpolative AR overlaid image 55d, the first interpolative AR overlaid image 55c, and the AR overlaid image 55a of the current frame are sequentially displayed in this order on the LCD 20, and are also recorded on the memory card 57 through the memory controller 56 (S12).

As long as the imaging is not terminated (N in S13), the above steps are executed again from the first step S1 to render respective frames successively with this image processing, so that AR added moving images are produced, displayed and recorded.

If the image pattern reader 45 cannot read the particular image pattern 43a because there is no 43a on the AR taking image 44a of the current frame (N in S6), the respective displaying images 50a and 50b and the first to fourth interpolative displaying images 50c to 50f are shown on the LCD 20 and recorded on the memory card 57 (S14).

Note that the step S10 is not executed for acquiring image data of the initial frame captured immediately after the start of imaging; the AR image overlying section 54 overlies the AR image 49a of the current frame on the displaying image 50a of the current frame in the area corresponding to the marker 43 thereof, to produce the AR overlaid image 55a of the current frame.

Second Embodiment

Figure 9:
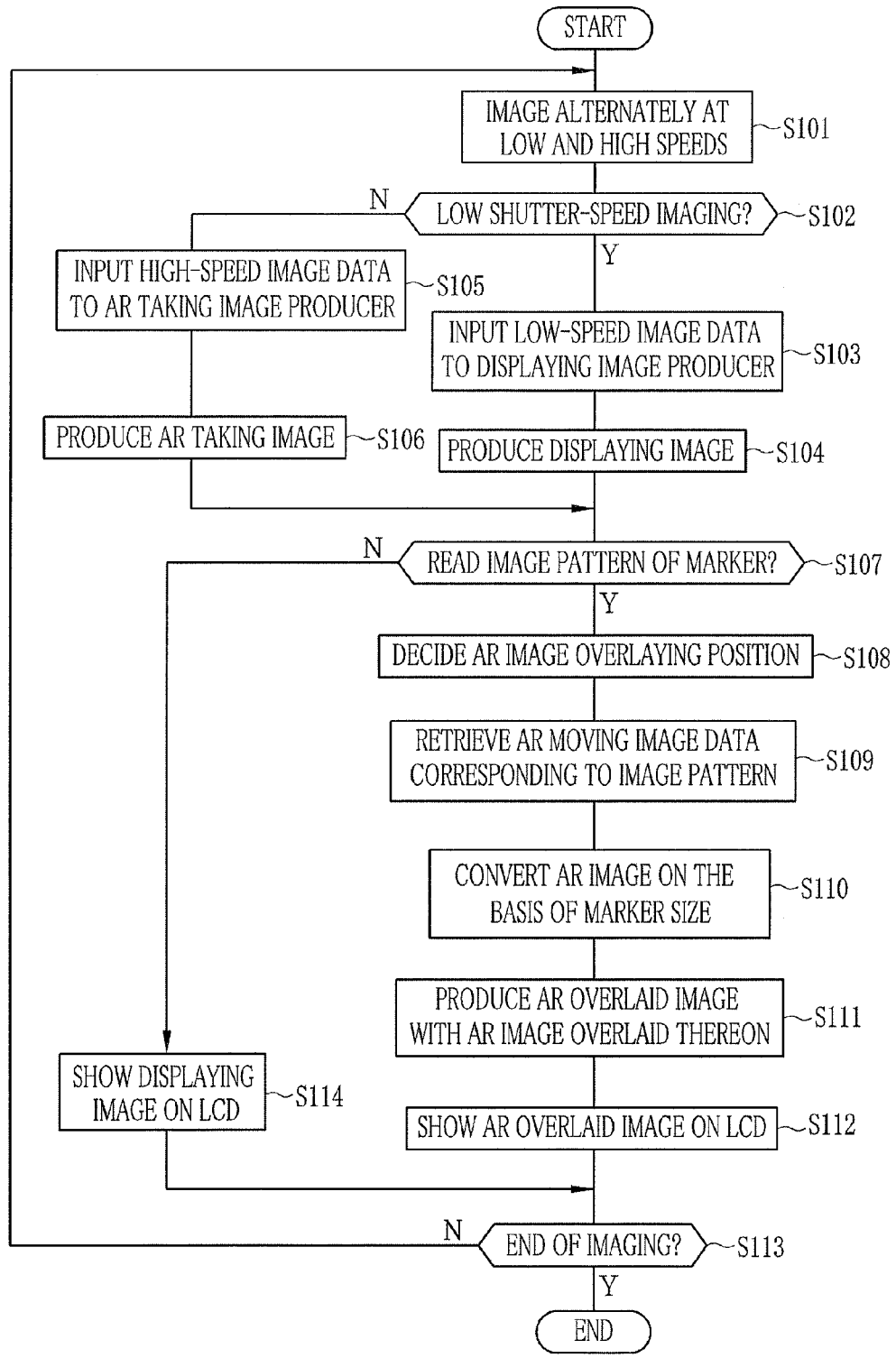
FIG. 9 is a flowchart illustrating procedures for displaying AR overlaid images according to a second embodiment, wherein low shutter-speed imaging and high shutter-speed imaging are made alternately.

In the second embodiment shown in FIG. 9, low shutter-speed imaging (e.g., with an exposure time of 1/60 sec.) and high shutter-speed imaging (e.g., with an exposure time of 1/2000 sec.) are made alternately frame by frame. Note that equivalent elements to those of the first embodiment are designated by the same reference numerals, so that the description of these elements will be omitted here.

When a shutter button 18 is pushed down to the full in the movie capturing mode, a CPU 40 controls alternate execution of the high shutter-speed imaging and the low shutter-speed imaging. In the present embodiment, first the low shutter-speed imaging is executed and then the high shutter-speed imaging is executed, and thereafter these two kinds of imaging are executed alternately.

An image input controller 38 inputs image data obtained during the high shutter-speed imaging (hereinafter called the high shutter-speed image data) and image data obtained during the low shutter-speed imaging (hereinafter called the low shutter-speed image data) to a buffer memory 52. The CPU 40 inputs the high-speed image data to an AR taking image producer 41, and inputs the low-speed image data to a displaying image producer 42.

The AR taking image producer 41 renders the high-speed image data with the SN ratio boosting process and the dynamic range widening process to produce an AR taking image 44a of the current frame. The AR taking image 44a of the current frame is fed to an image pattern reader 45. From the low-speed image data, the AR taking image producer 41 does not produce an AR taking image 44a of the current frame but reuses an AR taking image 44b of the preceding frame, which has been produced just before, as an AR taking image 44a of the current frame. Thus, AR taking images 44a and 44b are produced at 30 frames per second.

The displaying image producer 42 processes the low-speed image data for various image renderings to provide the image data with a high resolution and such a color reproduction that is suitable for displaying moving images, to produce a displaying image 50*a* of the current frame. As for the frames captured at the high shutter-speed, the displaying image producer 42 does not produce any displaying image 50*a* of the current frame but reuses a displaying image 50*b* of the preceding frame, which has been produced just before, as a displaying image 50*a* of the current frame. Thus, displaying images 50*a* and 50*b* are produced at 30 frames per second. In the present embodiment, the first to fourth interpolative displaying images 50*c* to 50*f*, the first to fourth interpolative AR images 49*c* to 49*f*, and the first to fourth interpolative AR overlaid images 55*c* to 55*f* are not produced nor displayed.

Since the low shutter-speed imaging is executed first at the start of imaging, no AR taking image 44*b* of the preceding frame was produced immediately before. Therefore, it is impossible to retrieve the AR moving image data and overly an AR image 49*a* of the current frame. For this reason, the displaying image 50*a* of the current frame is not displayed on an LCD 20. However, it may be possible to display merely the displaying image 50*a* of the current frame on the LCD 20.

Next, the operation of the above second embodiment will be described with reference to the flowchart of FIG. 9. Upon the shutter button 18 being pushed down to the full in the movie capturing mode, the high shutter-speed imaging and the low shutter-speed imaging are executed alternately (S101). Because the low shutter-speed imaging is made first, low-speed image data is first obtained (Y in S102). In this case, the low-speed image data is fed to the displaying image producer 42 (S103). The displaying image producer 42 processes the low-speed image data for various image renderings to provide the image data with a high resolution and such a color reproduction that is suitable for displaying moving images, thereby to produce a displaying image 50*a* of the current frame (S104). As for the frames captured at the low shutter speed, the AR taking image producer 41 does not produce an AR taking image 44*a* of the current frame but reuses an AR taking image 44*b* of the preceding frame, which has been produced just before, as an AR taking image 44*a* of the current frame.

On the other hand, when high-speed image data is obtained through the high shutter-speed imaging (N in S102), the high-speed image data is fed to the AR taking image producer 41 (S105). The AR taking image producer 41 renders the high-speed image data with the SN ratio boosting process and the dynamic range widening process to produce an AR taking image 44*a* of the current frame (S106). The AR taking image 44*a* of the current frame is fed to the image pattern reader 45. As for the frames captured at the high shutter-speed, the displaying image producer 42 does not produce any displaying image 50*a* of the current frame but reuses a displaying image 50*b* of the preceding frame, which has been produced just before, as a displaying image 50*a* of the current frame. Because other steps S107 to S110 are equivalent to the steps S6 to S9 of the first embodiment, explanation on these steps will be skipped.

The AR image overlying section 54 overlies the AR image 49*a* of the current frame on the displaying image 50*a* of the current frame in an area corresponding to the marker 43, to produce an AR overlaid image 55*a* of the current frame (S111). The AR overlaid image 55*a* of the current frame is displayed on the LCD 20 and recorded on a memory card 57 (S112). Because other steps S113 and S114 are equivalent to the steps S13 and S14 of the first embodiment, explanation on these steps will be omitted here.

Third Embodiment

Figure 10:
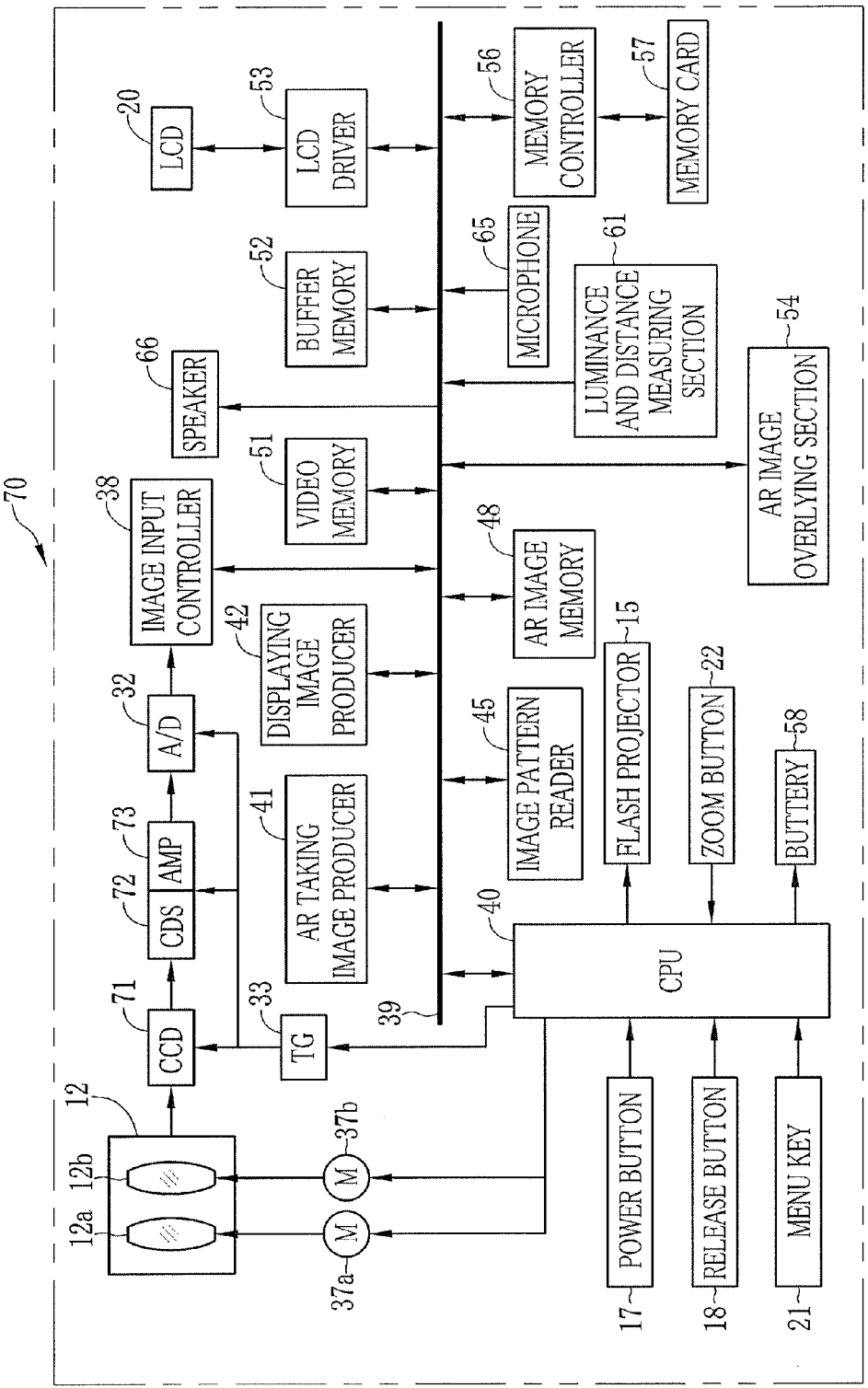
FIG. 10 is a block diagram illustrating an electric structure of a digital camera in accordance with a third embodiment, wherein low shutter-speed imaging and high shutter-speed imaging are made concurrently.
Figure 11:
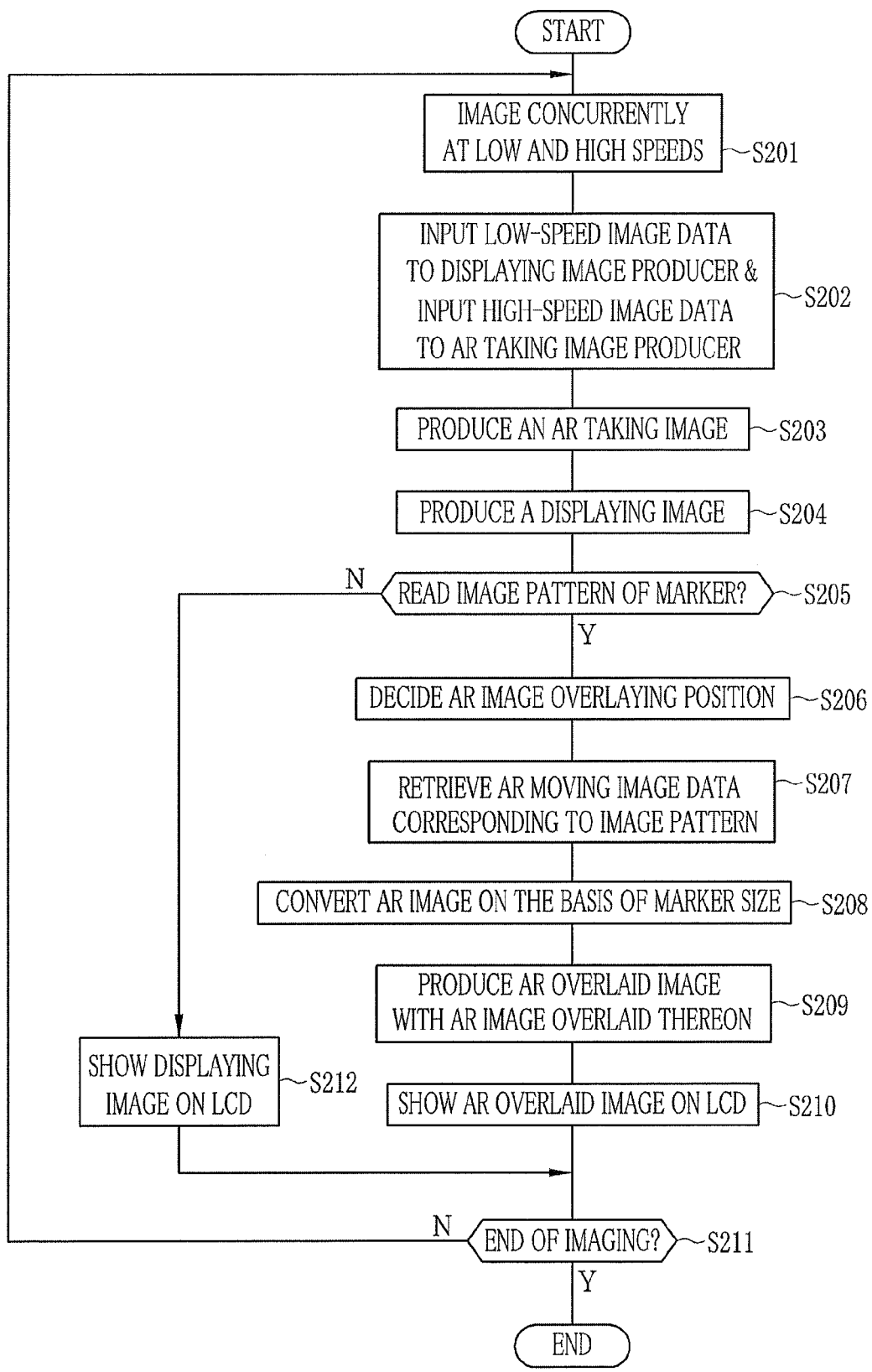
FIG. 11 is a flowchart illustrating procedures for displaying AR overlaid images in the third embodiment.

A digital camera 70 in accordance with the third embodiment, as shown in FIGS. 10 and 11, executes low shutter-speed imaging and high shutter-speed imaging concurrently. Note that equivalent elements to those of the first and second embodiments are designated by the same reference numerals, so that the description of these elements will be omitted here.

Behind a taking lens 12 is disposed a CCD sensor (hereinafter called CCD) 71. The CCD 71 is constituted of such a CCD that can execute low shutter-speed imaging and high shutter-speed imaging concurrently, for example, a super CCD honeycomb (a trademark) EXR (a trade name). When a release button 18 is pushed down to the full in a movie capturing mode, the low shutter-speed imaging and the high shutter-speed imaging are executed concurrently by varying shutter speeds (charge accumulating time durations) from one cell to another in the CCD 71.

Time-sequential three-color signals, as read out from the CCD 71, are sent to a correlated double sampling circuit (CDS) 72, for reduction of noise components, and are converted to three-color signals which exactly correspond to the amount of charges accumulated in the respective cells. The three-color signals output from the CDS 72 are amplified by an amplifier (AMP) 73 responsive to ISO sensitivity, and then converted to image data through an A/D converter 32.

An image input controller 38 sorts the image data according to the variations between the cells, to produce high-speed image data and low-speed image data. These two kinds of image data are fed to a buffer memory 52, from which the high-speed image data and the low-speed image data are fed to an AR taking image producer 41 and a displaying image producer 42, respectively.

The AR taking image producer 41 produces an AR taking image 44*a* of the current frame on the basis of the high-speed image data, and inputs the same in an image pattern reader 45. The displaying image producer 42 processes the low-speed image data for various image renderings to produce a displaying image 50*a* of the current frame.

Now the operation of the above third embodiment will be described with reference to the flowchart of FIG. 11. When a release button 18 is pushed down to the full in a movie capturing mode, the low shutter-speed imaging and the high shutter-speed imaging are concurrently executed, providing the low-speed image data and the high-speed image data (S201). The low-speed image data are fed to the displaying image producer 42, while the high-speed image data are fed to the AR taking image producer 41 (S202).

The AR taking image producer 41 subjects the high-speed image data to the SN boosting process and the dynamic range widening process, producing an AR taking image 44*a* of the current frame (S203). The AR taking image 44*a* of the current frame is fed to the image pattern reader 45.

The displaying image producer 42 produces a displaying image 50*a* of the current frame on the basis of the low-speed image data (S204). Because other steps S205 to S212 are equivalent to the steps S107 to S114 of the second embodiment, explanation on these steps will be omitted here.

Fourth Embodiment

Figure 12:
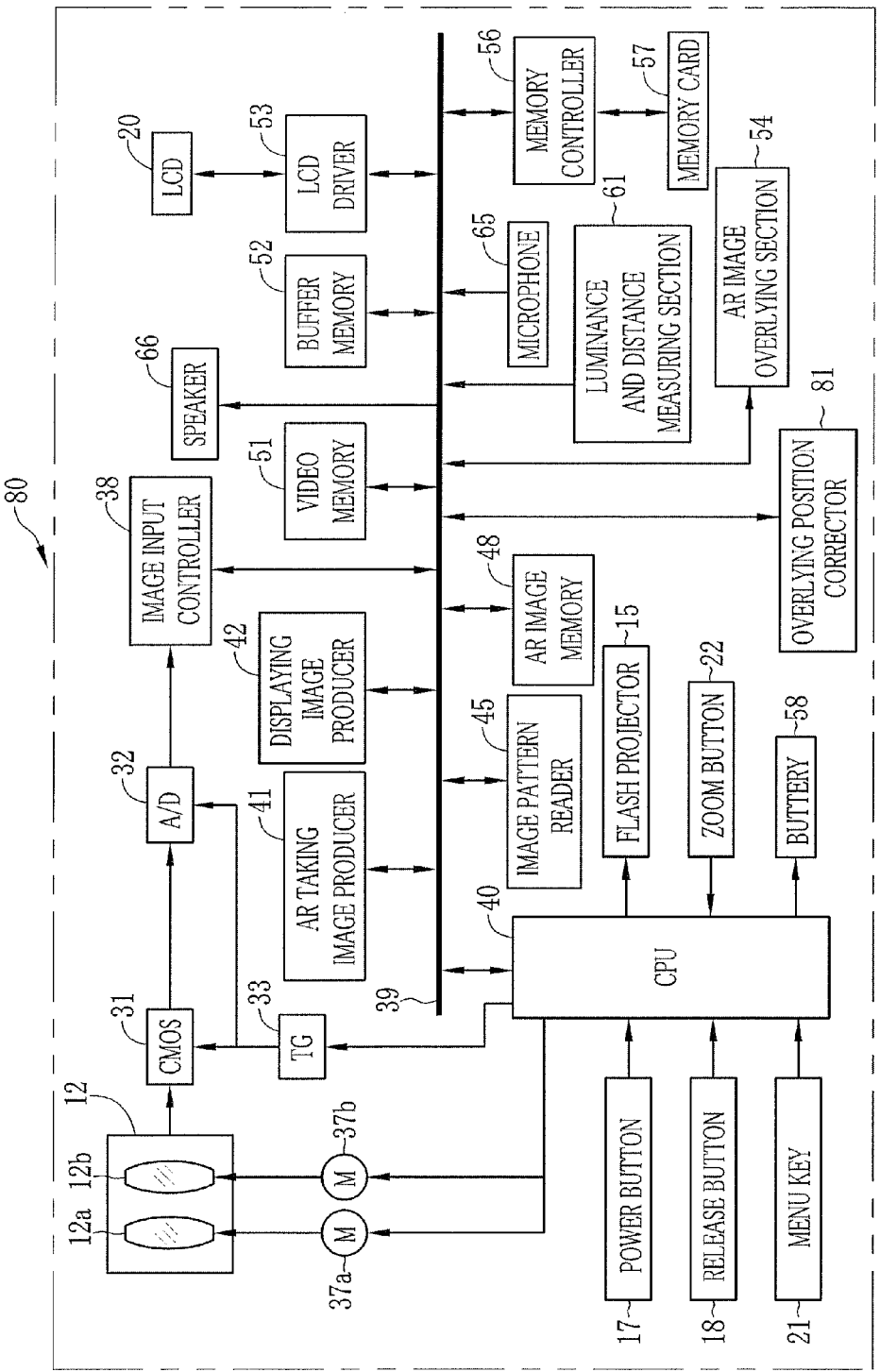
FIG. 12 is a block diagram illustrating an electric structure of a digital camera in accordance with a fourth embodiment, wherein the overlying position of the AR image may be corrected.
Figure 13:
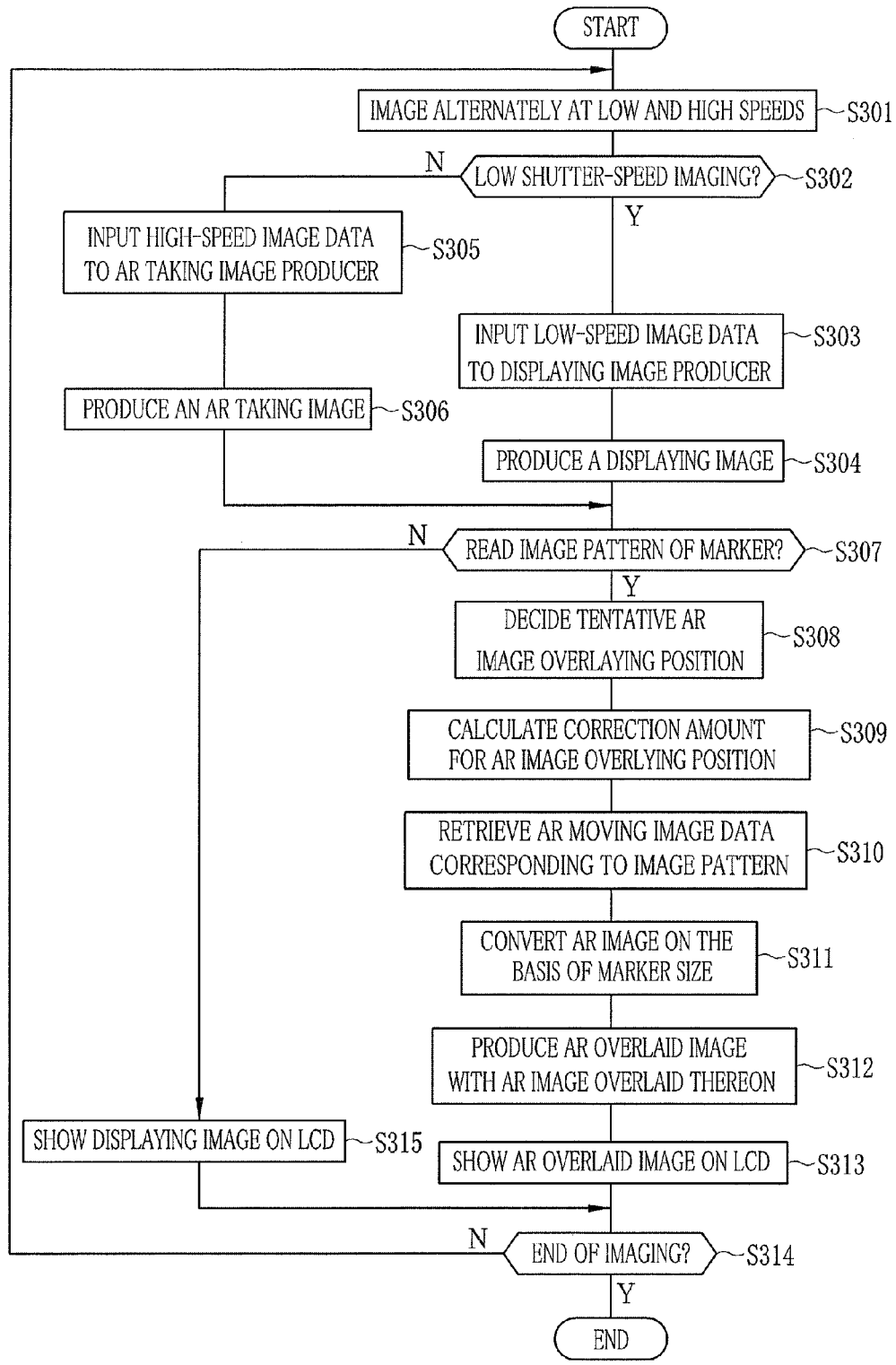
FIG. 13 is a flowchart illustrating procedures for displaying AR overlaid images in the fourth embodiment.

A digital camera 80 in accordance with the fourth embodiment, as shown in FIGS. 12 and 13, is configured to correct the overlying position of the AR image on the basis of a lag of production time between an AR taking image 44*a* of the current frame and a displaying image 50*a* of the current frame. Note that equivalent elements to those of the second embodiment are designated by the same reference numerals, so that the description of these elements will be omitted here.

When a shutter button 18 is pushed down to the full in a movie capturing mode, a CPU 40 executes high shutter-speed imaging and low shutter-speed imaging alternately. Since no displaying image 50a of the current frame is produced in the high shutter-speed imaging, a displaying image 50b of the preceding frame, which has been produced just before, is reused as a displaying image 50a of the current frame. In addition, the CPU 40 uses an AR taking image 44a of the latest current frame, which is produced on the basis of the high-speed image data, to decide an overlying position (the position of a marker 43) in an AR image 49a of the current frame. In the case where the photographer is in motion or the like, the position of the marker 43 in the displaying image 50b of the preceding frame, which is to be reused, is different from that in the AR taking image 44a of the current frame. For this reason, the position of the marker 43 in the displaying image 50b of the preceding frame deviates from the overlying position of the AR image 49a of the current frame, as decided in the way as described above. If the AR image 49a of the current frame is overlaid on the decided overlying position without any correction, the AR image 49a of the current frame would be overlaid on the position deviating from the marker 43.

A overlying position corrector 81 detects the movement of the same characteristic point between the images on the basis of the high-speed image data thereof, and detects the speed of movement (mm/sec.) of these characteristic points. Then, the overlying position corrector 81 calculates a correction amount for the AR image overlying position as a product of the speed of movement of the characteristic points and a time interval between the frames (1/30 sec.).

When producing an AR overlaid image 55a of the current frame by overlying the AR image 49a of the current frame, an AR image overlying section 54 overlies the AR image 49a of the current frame in a position displaced by the correction amount that is calculated by the overlying position corrector 81, to produce the AR overlaid image 55a of the current frame.

Next, the operation of the above fourth embodiment will be described with reference to the flowchart of FIG. 13. Upon the shutter button 18 being pushed down to the full in the movie capturing mode, the high shutter-speed imaging and the low shutter-speed imaging are executed alternately (S301). Because other steps S302 and S307 are equivalent to the steps S102 to S107 of the second embodiment, explanation on these steps will be skipped.

When an image pattern reader 45 reads a particular image pattern 43a on an AR taking image 44a of the current frame (Y in step S307), the position and size of a marker 43 in the AR taking image 44a of the current frame are detected, and a tentative display position for an AR image is calculated (S308).

Before the image pattern reader 45 detects the particular image pattern 43a, the overlying position corrector 81 compares the high-speed image data of a plurality of frames to detect the speed of movement of the same characteristic points in the images. Then a correction amount for an AR image overlying position is calculated as a product of the speed of movement of the characteristic points and the time intervals (1/30 sec.) between the frames (S309).

The CPU 40 retrieves data of an AR moving image, which is associated with the read particular image pattern 43a, from among data of multiple AR moving images in an AR image memory 48 (S310). On the basis of the size of the marker 43, which has been detected by the image pattern reader 45, the CPU 40 converts one frame of the retrieved AR moving image data to an AR image 49a that is approximately equal in size to the marker 43 (S311).

When producing an AR overlaid image 55a of the current frame by overlying the AR image 49a of the current frame, the image overlying section 54 overlies the AR image 49a of the current frame in a position displaced by the correction amount, which is calculated by the overlying position corrector 81, from the tentative position, to produce the AR overlaid image 55a of the current frame (S312). Because other steps S313 to S315 are equivalent to the steps S112 to S114 of the second embodiment, explanation on these steps will be omitted here.

Fifth Embodiment

Figure 14:
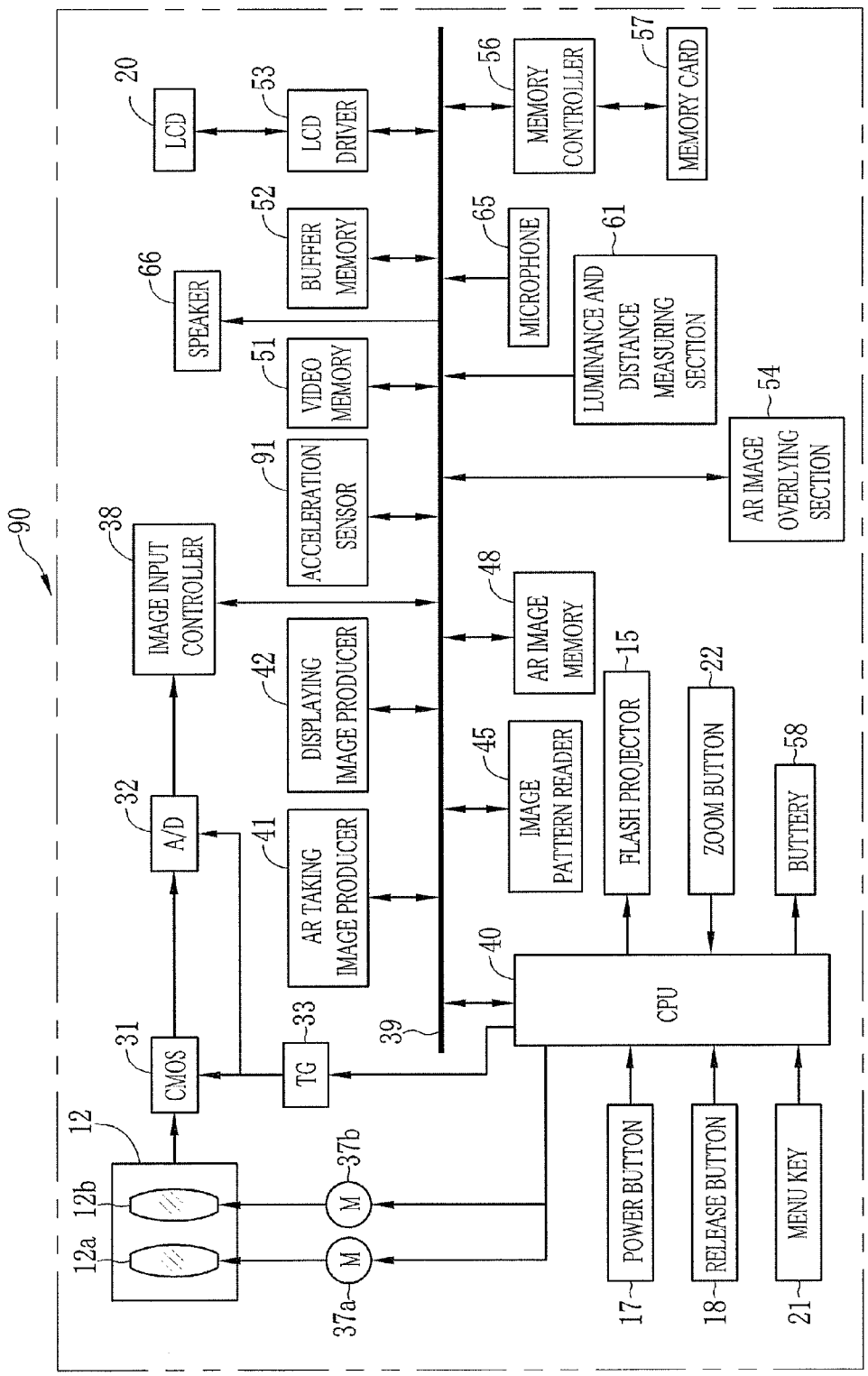
FIG. 14 is a block diagram illustrating an electric structure of a digital camera in accordance with a fifth embodiment, wherein the shutter speed may be changed according to the speed of movement of the camera.
Figure 15:
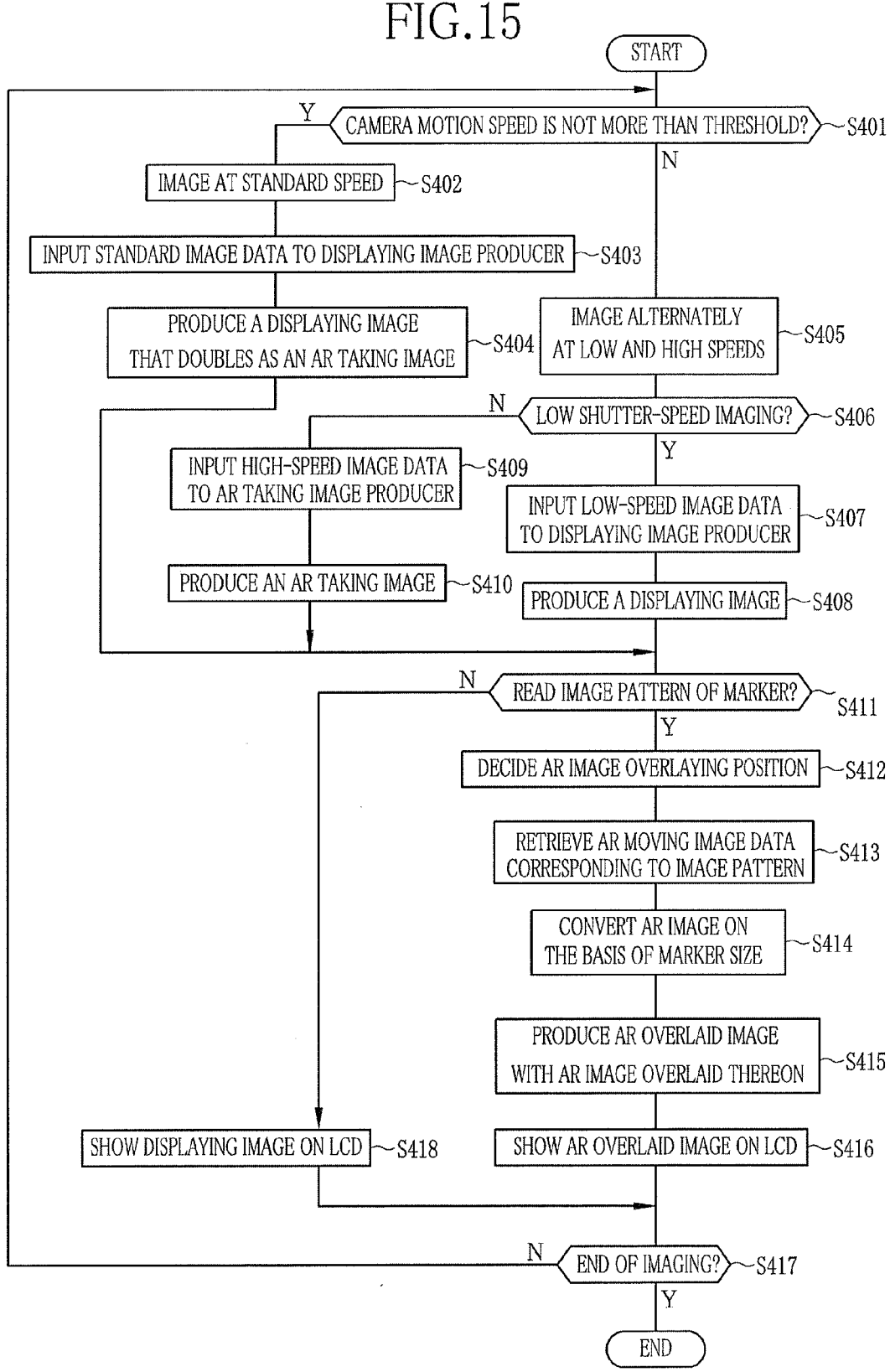
FIG. 15 is a flowchart illustrating procedures for displaying AR overlaid images in the fourth embodiment.
Figure 16:
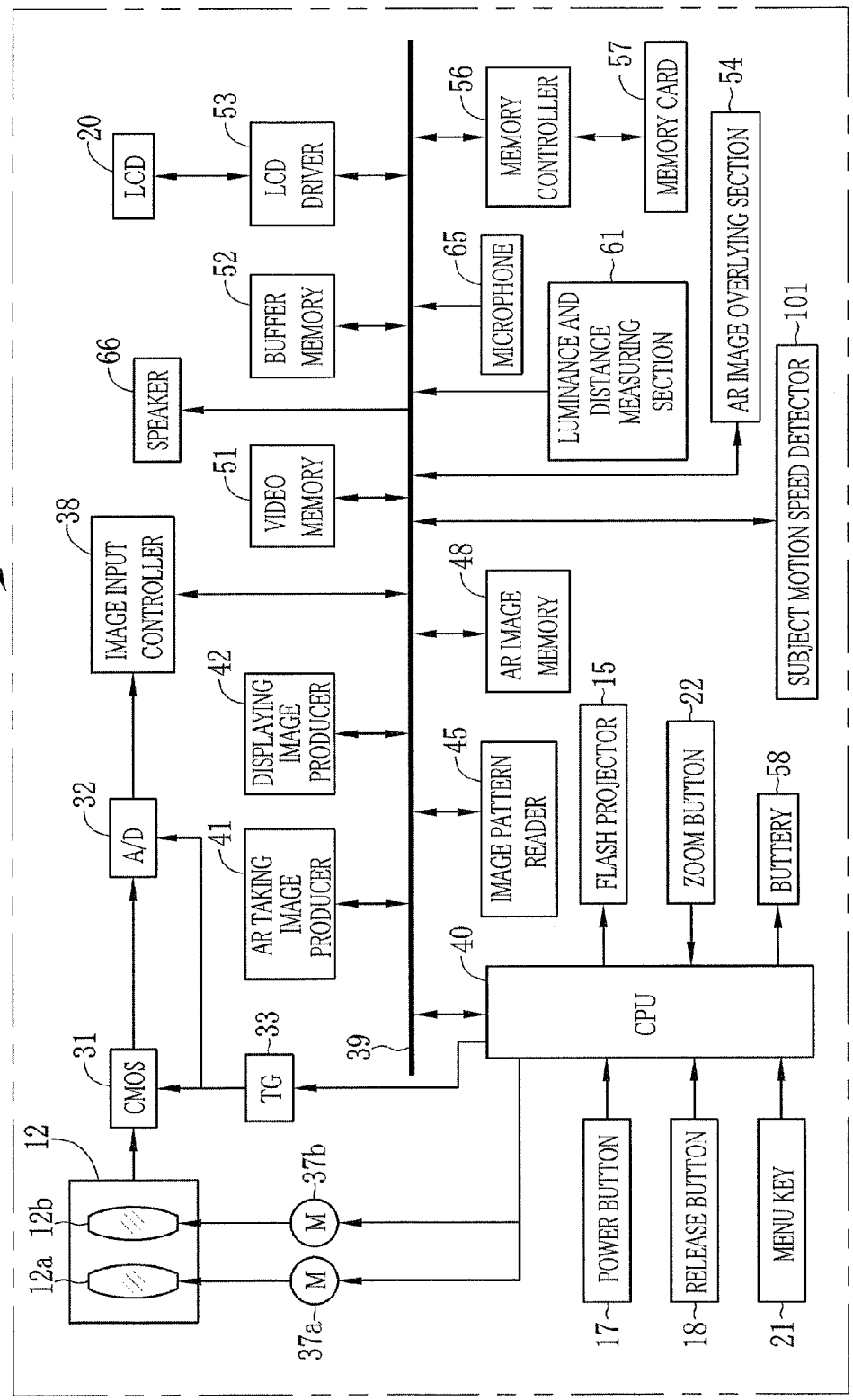
FIG. 16 is a block diagram illustrating an electric structure of a digital camera in accordance with a sixth embodiment, wherein the shutter speed may be changed according to the speed of movement of a marker.

A digital camera 90 in accordance with the fifth embodiment, as shown in FIGS. 14 and 15, is provided with an acceleration sensor 91. The acceleration sensor 91 detects the acceleration of the digital camera 90. A CPU 40 calculates the motion speed (mm/sec.) of the digital camera 90 on the basis of the detected acceleration, and determines whether the motion speed of the camera is below or above a threshold level (e.g., 100 mm/sec.). If the CPU 40 determines that the camera motion speed is not more than the threshold level at the moment when a release button 18 is fully pushed down, the CPU 40 executes standard shutter-speed imaging (e.g., with an exposure time of 1/60 sec.).

If the CPU 40 determines that the camera motion speed is above the threshold level, the CPU 40 executes low shutter-speed imaging and high shutter-speed imaging alternately. Note that the camera motion speed will be determined not more than the threshold level if the photographer handling the digital camera 90 is standstill and the handshake is little. On the other hand, if the photographer is in motion or the handshake is big, the camera motion speed will be determined above the threshold level.

Image data obtained through the standard shutter-speed imaging (hereinafter called standard image data) is fed to a displaying image producer 42. On the other hand, while the low shutter-speed imaging and the high shutter-speed imaging are being performed alternately, high-speed image data is fed to an AR taking image producer 41, and low-speed image data is fed to the displaying image producer 42.

The displaying image producer 42 processes the standard-speed image data or the low-speed image data for various image renderings to produce a displaying image 50a of the current frame.

The AR taking image producer 41 produces an AR taking image 44a of the current frame on the basis of the high-speed image data while the low shutter-speed imaging and the high shutter-speed imaging are being performed alternately. On the other hand, during the standard shutter-speed imaging, the AR taking image producer 41 does not execute the production process for the AR taking image 44a of the current frame. Instead, the displaying image 50a of the current frame doubles as an AR taking image 44a of the current frame. In this case, an image pattern reader 45 reads a particular image pattern 43a on the displaying image 50a of the current frame and also detects the position and size of a marker 43 on the displaying image 50a of the current frame.

Next, the operation of the above fifth embodiment will be described with reference to the flowchart of FIG. 15. The CPU 40 calculates the camera motion speed on the basis of the detected acceleration. When the release button 18 is fully pushed down in a movie capturing mode while the camera motion speed is not more than the threshold level (Y in S401), the standard shutter-speed imaging is executed (S402). The standard-speed image data is fed to the displaying image producer 42 (S403). The displaying image producer 42 produces a displaying image 50a of the current frame. The AR taking image producer 41 does not produce an AR taking image 44a then, but the displaying image 50a of the current frame doubles as an AR taking image 44a of the current frame (S404). The camera motion speed will be determined to be not more than the threshold level if the photographer is standstill and the handshake is little. In this situation, the AR taking image producer 41 is not actuated, saving the time for image processing and the power consumption as well.

On the other hand, when the camera motion speed is above the threshold level (N in S401), the low shutter-speed imaging and the high shutter-speed imaging will be performed alternately upon the release button 18 being pushed down to the full (S405). Because other steps S406 to S418 are equivalent to the steps S102 to S114 of the second embodiment, explanation on these steps will be omitted here.

Sixth Embodiment

A digital camera 100 in accordance with the sixth embodiment, as shown in FIGS. 16 to 19, is provided with a marker motion speed detector 101. The marker motion speed detector 101 detects the motion of a marker 103 on the basis of image data of a series of through-images, and detects the motion speed (mm/sec.) thereof. In the present embodiment, the marker 103 is assumed to be provided on a moving subject like a car. CPU 40 determines whether the detected marker motion speed is below or above a threshold level (e.g., 100 mm/sec.). If the CPU 40 determines that the marker motion speed is not more than the threshold level, the CPU 40 executes standard shutter-speed imaging. If it is determined that the marker motion speed is above the threshold level, the CPU 40 executes low shutter-speed imaging and high shutter-speed imaging alternately.

Standard-speed image data is fed to a displaying image producer 42. On the other hand, while the low shutter-speed imaging and the high shutter-speed imaging are being performed alternately, high-speed image data is fed to an AR taking image producer 41 and low-speed image data is fed to the displaying image producer 42.

Figure 17:
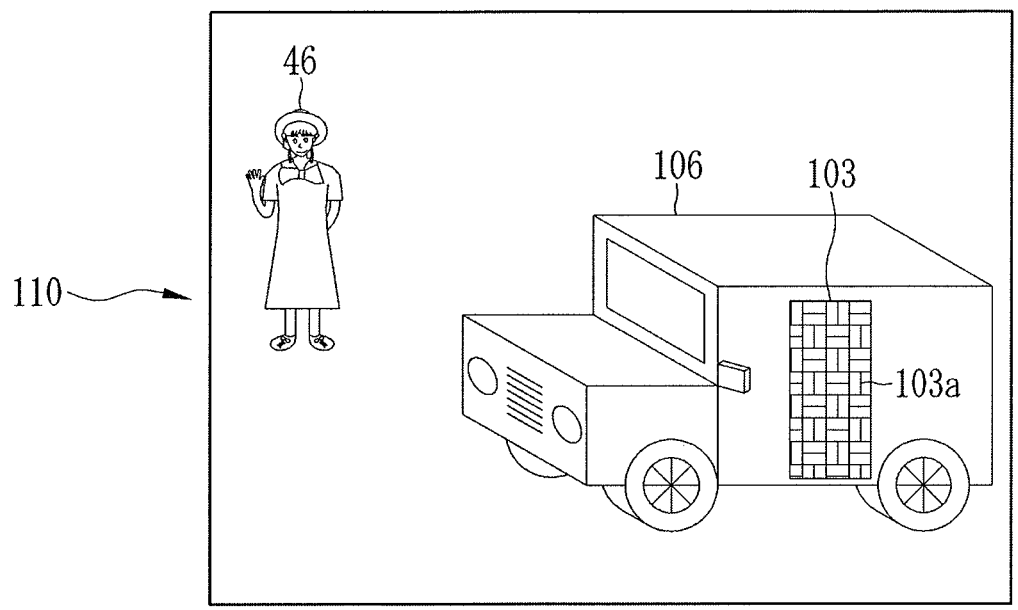
FIG. 17 is an explanatory diagram illustrating an AR taking image or a displaying image in the sixth embodiment.

The displaying image producer 42 processes the standard-speed image data or the low-speed image data for various image renderings to produce a displaying image 110 of the current frame (see FIG. 17).

As the high shutter-speed imaging is performed, the AR taking image producer 41 produces an AR taking image of the current frame on the basis of the high-speed image data. On the other hand, during the standard shutter-speed imaging, the AR taking image producer 41 does not execute the AR taking image production process for the current frame. Instead, the displaying image 110 of the current frame doubles as an AR taking image of the current frame. In the present embodiment, the AR taking image of the current frame or the displaying image 110 of the current frame consists of a main subject image 46 and an image 106 of the car to which the marker 103 is attached.

An image pattern reader 45 reads a particular image pattern 103a on the displaying image 110 of the current frame when the standard shutter-speed imaging has been carried out. Then the image pattern reader 45 detects the position and size of the marker 103 in the displaying image 110 of the current frame. The image pattern reader 45 also reads the particular image pattern 103a on the AR taking image of the current frame when the low shutter-speed or high shutter-speed imaging has been carried out. Then the image pattern reader 45 detects the position and size of the marker 103 in the AR taking image of the current frame. The CPU 40 retrieves data of an AR moving image that is associated with the read particular image pattern 103a from among many AR moving images stored in an AR image memory 48.

Figure 18:
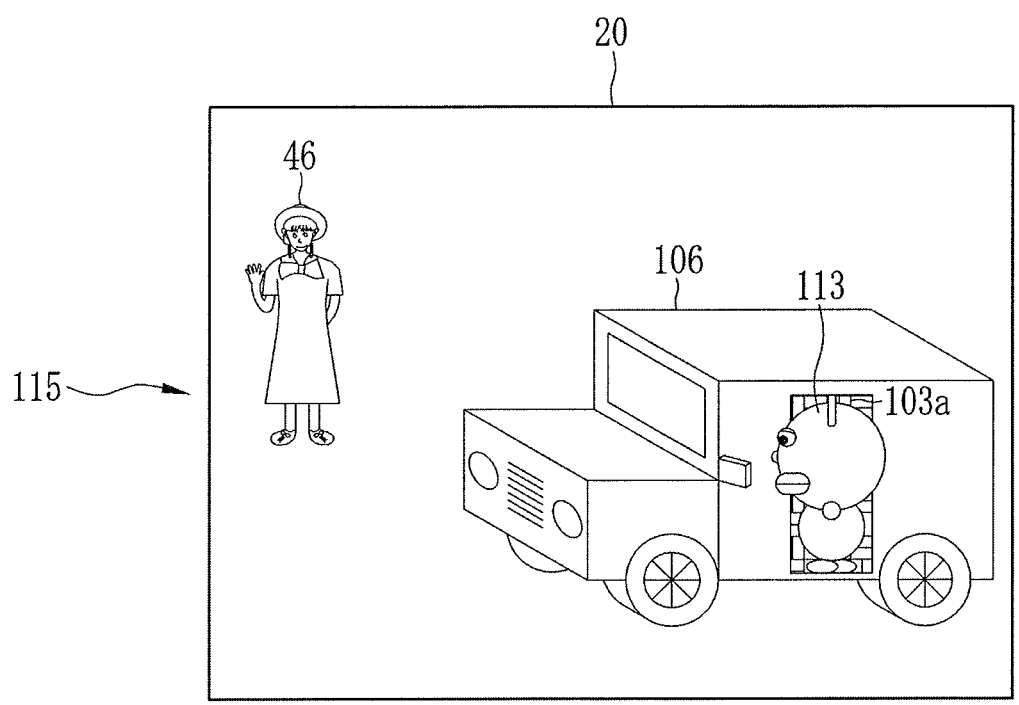
FIG. 18 is an explanatory diagram illustrating an AR overlaid image being displayed in the sixth embodiment.

As shown in FIG. 18, the CPU 40 converts one frame of the retrieved AR moving image data to an AR image 113 of the current frame on the basis of the size of the marker 103 that is detected by the image pattern reader 45, the AR image 113 being approximately equal in size to the marker 103 in the present embodiment.

The CPU 40 produces an AR overlaid image 115 of the current frame, wherein the AR image 113 of the current frame is overlaid on the displaying mage 110 in the area corresponding to the marker 103. The AR overlaid image 115 of the current frame is displayed on the LCD 20 and recorded as an AR overlaid image of the preceding frame on a memory card 57.

Next, the operation of the above sixth embodiment will be described with reference to the flowchart of FIG. 19. The marker motion speed detector 101 detects the motion speed of the marker 103 (the motion speed of the car image 106 that is provided with the marker 103) on the basis of image data of a series of through-images. When the release button 18 is fully pushed down in a movie capturing mode while the marker motion speed is not more than the threshold level (Y in S501), the standard shutter-speed imaging is executed (S502). The standard-speed image data is fed to the displaying image producer 42 (S503). The displaying image producer 42 produces a displaying image 110 of the current frame. The AR taking image producer 41 does not produce an AR taking image 105 then, but the displaying image 110 doubles as an AR taking image 105 of the current frame (S504). Since the AR taking image producer 41 is not actuated while the marker motion speed is low, the image processing time and the power consumption will be suppressed.

On the other hand, when the marker motion speed is above the threshold level (N in S501), the low shutter-speed imaging and the high shutter-speed imaging will be performed alternately (S505). Because other steps S506 to S518 are equivalent to the steps S102 to S114 of the second embodiment, explanation on these steps will be omitted here.

Although digital cameras have been described in the above embodiments, the present invention is applicable to an image recording system that is constituted of a digital camera, a personal computer and other components. In this case, on the basis of images captured by the digital camera that serves as an imaging unit, the personal computer may carry out the production of displaying images, the production of images for additional information, the reading of particular image pattern, the acquisition of additional information and the production of additional information overlaid images. Moreover, the present invention is applicable to a camera phone, a head mounted display with camera, or the like.

The present invention is not only applicable to such moving images that are recorded on a recording medium like a memory card, but also to live-view images and the like.

In the above embodiments, data of a plurality of AR moving images are previously recorded in the AR image memory, so that one frame associated with the read particular image pattern is retrieved from among these AR moving image data. It may be possible to previously record data of a plurality of AR moving images in a server, and make an access to the server to retrieve the AR moving image corresponding to the read particular image pattern therefrom.

Furthermore, the AR images may represent letters, characters or symbols, while the AR images represent illustrations or cartoons in the above embodiments.

Various changes and modifications are possible in the present invention and may be understood to be within the present invention.

What is claimed is:

1. An image processing apparatus comprising:
   an imaging section for capturing images in continuous succession by imaging a subject together with a marker, the captured images constituting moving images;
   a displaying image producing section for producing a displaying image on the basis of the captured image each time the image is captured, the displaying image being for making the motion of the subject continuous in displaying the moving images;
   an additional information reference image producing section for producing an additional information reference image on the basis of the captured image each time the image is captured, the additional information reference image representing the subject with less blurs and being used to acquire additional information that is to be overlaid on the displaying image;
   a reading section for reading the marker on the additional information reference image;
   an additional information recording section having additional information recorded therein in association with individual markers;
   an additional information acquiring section for retrieving and acquiring additional information that is associated with the marker read by the reading section from among a plurality of additional information recorded in the additional information recording section;
   an additional information overlaid image producing section for producing an additional information overlaid image which has the additional information, acquired by the additional information acquiring section, overlaid on the displaying image in the area of the marker; and
   a displaying device for displaying the additional information overlaid image.

2. The image processing apparatus claimed in claim 1, wherein the imaging section captures images at a shutter speed suitable for producing the additional information reference image, and the displaying image producing section also produces a plurality of interpolative displaying images which are to be displayed in between successive ones of the displaying images.

3. The image processing apparatus claimed in claim 1, wherein
   the imaging section makes imaging alternately at a first shutter speed that is suitable for producing the displaying image and a second shutter speed that is higher than the first shutter speed and suitable for producing the additional information reference image;
   the displaying image producing section produces the displaying image on the basis of an image taken through the first shutter speed imaging; and
   the additional information reference image producing section produces the additional information reference image on the basis of an image taken through the second shutter speed imaging.

4. The image processing apparatus claimed in claim 1, wherein
   the imaging section makes imaging concurrently at a first shutter speed that is suitable for producing the displaying image and a second shutter speed that is higher than the first shutter speed and suitable for producing the additional information reference image;
   the displaying image producing section produces the displaying image on the basis of an image taken through the first shutter speed imaging; and
   the additional information reference image producing section produces the additional information reference image on the basis of an image taken through the second shutter speed imaging.

5. The image processing apparatus claimed in claim 3, comprising a position correcting section for correcting the position of overlying the additional information on the displaying image on the basis of a difference in time of production between the displaying image and the additional information reference image.

6. The image processing apparatus claimed in claim 1, wherein
   the displaying image producing section produces the displaying image to have a high resolution and such color reproduction that is suitable for displaying moving images, and
   the additional information reference image producing section produces the additional information reference image to have a higher SN ratio and a wider dynamic range than the displaying image.

7. The image processing apparatus claimed in claim 2, wherein
   the displaying image producing section produces the displaying image to have a high resolution and such color reproduction that is suitable for displaying moving images, and
   the additional information reference image producing section produces the additional information reference image to have a higher SN ratio and a wider dynamic range than the displaying image.

8. The image processing apparatus claimed in claim 1, comprising:
   a detecting section for detecting the speed of movement of the imaging section; and
   a determining section for determining whether the speed of movement detected by the detecting section is more than a predetermined threshold level or not; wherein,
   when the determining section determines that the speed of movement is not more than the threshold level, the additional information reference image producing section does not produce the additional information reference image and the reading section reads the marker in the displaying image.

9. The image processing apparatus claimed in claim 2, comprising:
   a detecting section for detecting the speed of movement of the imaging section; and
   a determining section for determining whether the speed of movement detected by the detecting section is more than a predetermined threshold level or not; wherein,
   when the determining section determines that the speed of movement is not more than the threshold level, the additional information reference image producing section does not produce the additional information reference image and the reading section reads the marker in the displaying image.

10. The image processing apparatus claimed in claim 1, comprising:
   a marker motion speed detecting section for detecting the motion speed of the marker; and
   a marker motion speed determining section for determining whether the motion speed detected by the marker motion speed detecting section is more than a predetermined threshold level or not; wherein, when the marker motion speed determining section determines that the motion speed is not more than the threshold level, the additional information reference image producing section does not produce the additional information reference image and the reading section reads the marker in the displaying image.

11. The image processing apparatus claimed in claim 2, comprising:
a marker motion speed detecting section for detecting the motion speed of the marker; and
a marker motion speed determining section for determining whether the motion speed detected by the marker motion speed detecting section is more than a predetermined threshold level or not; wherein,
when the marker motion speed determining section determines that the motion speed is not more than the threshold level, the additional information reference image producing section does not produce the additional information reference image and the reading section reads the marker in the displaying image.

12. The image processing apparatus claimed in claim 1, comprising an additional information overlaid image recording section for recording the additional information overlaid image.

13. The image processing apparatus claimed in claim 2, comprising an additional information overlaid image recording section for recording the additional information overlaid image.

14. An image processing method comprising:
an imaging step for capturing images in continuous succession by imaging a subject together with a marker, the captured images constituting moving images;
a displaying image producing step for producing a displaying image on the basis of the captured image each time the image is captured, the displaying image being for making the motion of the subject continuous in displaying the moving images;
an additional information reference image producing step for producing an additional information reference image on the basis of the captured image each time the image is captured, the additional information reference image representing the subject with less blurs and being used to acquire additional information that is to be overlaid on the displaying image;
a reading step for reading the marker on the additional information reference image;
an additional information acquiring step for retrieving and acquiring additional information that is associated with the marker read by the reading step from an additional information recording section in which additional information is recorded in association with individual markers;
an additional information overlaid image producing step for producing an additional information overlaid image which has the additional information, acquired by the additional information acquiring step, overlaid on the displaying image in the area of the marker; and
a displaying step for displaying the additional information overlaid image.

15. An image processing method claimed in claim 14, wherein the displaying image producing step produces a plurality of interpolative displaying images which are to be displayed in between two of the captured displaying images.

16. An image processing method claimed in claim 15, wherein the imaging step makes imaging at a first shutter speed to produce the displaying image and at a second shutter speed that is higher than the first shutter speed to produce the additional information reference image.

\* \* \* \* \*